United States Patent
Park et al.

(10) Patent No.: US 8,698,985 B2
(45) Date of Patent: Apr. 15, 2014

(54) OPTICAL FILM FOR REDUCING COLOR SHIFT AND LCD DEVICE HAVING THE SAME

(75) Inventors: Seong Sik Park, ChungCheongNam-Do (KR); Eun Young Cho, ChungCheongNam-Do (KR); Seung Won Park, ChungCheongNam-Do (KR); In Sung Sohn, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 288 days.

(21) Appl. No.: 12/955,239

(22) Filed: Nov. 29, 2010

(65) Prior Publication Data
US 2011/0128483 A1  Jun. 2, 2011

(30) Foreign Application Priority Data
Nov. 30, 2009  (KR) .................. 10-2009-0116766

(51) Int. Cl.
*G02F 1/1335* (2006.01)
(52) U.S. Cl.
USPC ............. 349/112; 349/95; 349/64; 349/65
(58) Field of Classification Search
None
See application file for complete search history.

(56) References Cited

U.S. PATENT DOCUMENTS

| 5,600,456 A | 2/1997 | Maruyama et al. |
| 6,122,026 A * | 9/2000 | Takatani et al. ............. 349/112 |
| 6,784,962 B2 * | 8/2004 | Sumida et al. ............. 349/122 |
| 7,576,914 B2 * | 8/2009 | Goto ............................ 359/599 |
| 2003/0035078 A1 | 2/2003 | Maruyama et al. |
| 2005/0024565 A1 | 2/2005 | Hwang et al. |

FOREIGN PATENT DOCUMENTS

| JP | 1995-120743 | 5/1995 |
| JP | 1996-194217 A | 7/1996 |
| JP | 1997-049925 | 2/1997 |
| KR | 100191482 B1 | 6/1999 |
| KR | 10-20000070114 A | 11/2000 |
| KR | 10-20020073924 A | 9/2002 |
| KR | 10-0765308 | 10/2007 |
| WO | 2006112325 A1 | 10/2006 |

* cited by examiner

*Primary Examiner* — Thanh-Nhan P Nguyen
(74) *Attorney, Agent, or Firm* — Lerner, David, Littenberg, Krumholz & Mentlik, LLP

(57) ABSTRACT

An optical film for reducing color shift is provided in front of a display panel. The optical film includes a background layer, and a plurality of lens parts, which are spaced apart from each other, engraved or embossed on the background layer. The lens parts diffuse light incident thereon and then to mix the diffused light with light passing between the lens parts. The lens parts have a depth to width ratio of 0.25 or more, a spacing to pitch ratio ranging from 0.5 to 0.95, and a pitch of 45 μm or less. A display device may include the optical film.

16 Claims, 44 Drawing Sheets

FIG. 11
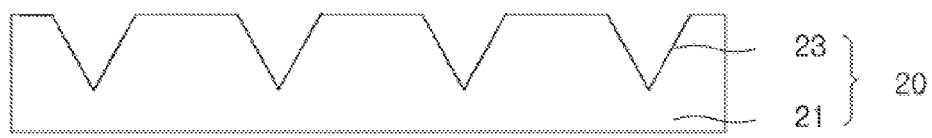
FIG. 12
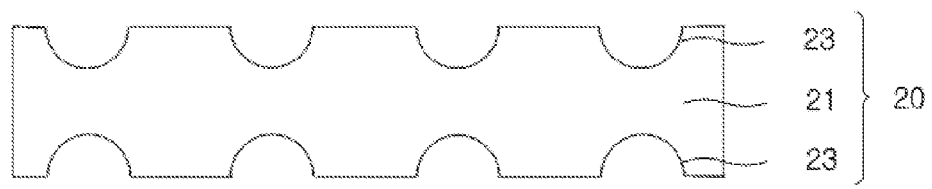

FIG. 3 5
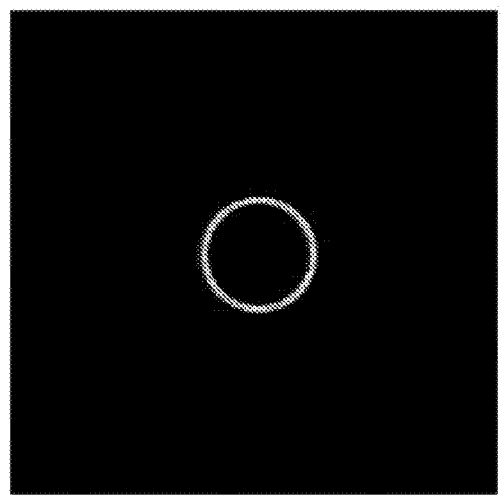
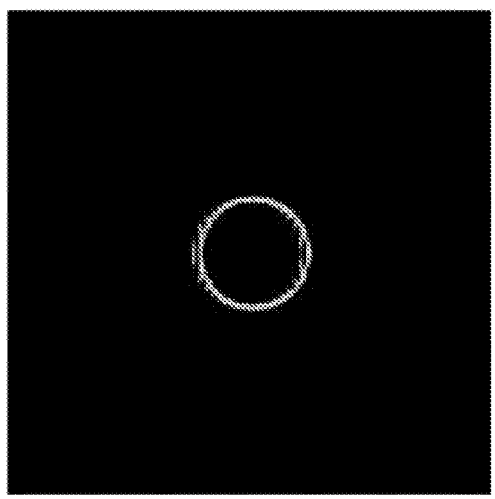
sample #6_P3  sample #6_Ref.

6_ref.    #6_P1

OPTICAL FILM FOR REDUCING COLOR SHIFT AND LCD DEVICE HAVING THE SAME

CROSS REFERENCE TO RELATED APPLICATION

The present application claims priority from Korean Patent Application Number 10-2009-0116766 filed on Nov. 30, 2009, the entire contents of which application are incorporated herein for all purposes by this reference.

BACKGROUND OF THE INVENTION

1. Field of the Invention

The present invention relates to an optical film for a display device and a display device having the same, and more particularly, to an optical film for reducing color shift, which has engraved or embossed lens parts in order to reduce color shift depending on the watching angle, and a display device having the same.

2. Description of Related Art

In response to the emergence of the advanced information society, components and devices related to photoelectronics have been significantly improved and rapidly disseminated. Among them, image display devices have been widely distributed as TVs, Personal Computer (PC) monitors, and the like. Moreover, attempts are underway to simultaneously increase the size and reduce the thickness of such display devices.

A Liquid Crystal Display (LCD) is one type of flat panel display, and displays images using liquid crystals. The LCD is widely used throughout the industry since it has the advantages of light weight, low driving voltage, and low power consumption compared to other display devices.

FIG. 1 is a conceptual view schematically showing the basic structure and operating principle of an LCD 100.

With reference by way of example to a conventional Vertical Alignment (VA) LCD, two polarizer films 110 and 120 are arranged such that their optical axes are oriented perpendicular to each other. Liquid crystal molecules 150 having birefringence characteristics are interposed and arranged between two transparent substrates 130, which are coated with transparent electrodes 140. When an electric field is applied from a power supply unit 180, the liquid crystal molecules move and are aligned perpendicular to the electric field.

Light emitted from a backlight unit is linearly polarized after passing through the first polarizer film 120. As shown in the left of FIG. 1, the liquid crystals remain perpendicular to the substrates when no power is applied. As a result, the light, which is in a linearly polarized state, is blocked by the second polarizer film 110, the optical axis of which is perpendicular to that of the first polarizer film 120.

In the meantime, as shown in the right of FIG. 1, when power is on, the electric field causes the liquid crystal to shift to a horizontal alignment parallel to the substrates, between the two orthogonally oriented polarizer films 110 and 120. Thus, the linearly polarized light from the first polarizer film is converted into another linearly polarized light of which the polarization is rotated by 90°, circularly polarized light, or elliptically polarized light while passing through the liquid crystal molecules before it reaches the second polarizer film. The converted light is then able to pass through the second polarizer film. It is possible to gradually change the orientation of the liquid crystal from the vertical orientation to the horizontal orientation by adjusting the intensity of the electric field, thereby allowing control of the intensity of light emission.

FIG. 2 is a conceptual view showing the orientation and optical transmittance of liquid crystals depending on the watching angle.

When liquid crystal molecules are aligned in a predetermined direction in a pixel 220, the orientation of the liquid crystal molecules looks different depending on the watching angle.

When viewed from the front left (210), the liquid crystal molecules look as if they are substantially aligned along the horizontal orientation 212, and thus the screen looks relatively brighter. When viewed from the front along the line 230, the liquid crystal molecules are seen to be aligned along the orientation 232, which is the same as the actual orientation of the liquid crystal molecules inside the pixel 220. In addition, when viewed from the front right (250), the liquid crystal molecules look as if they are substantially aligned along the vertical orientation 252, and thus the screen looks somewhat darker.

Accordingly, the viewing angle of the LCD is greatly limited compared to other displays that intrinsically emit light, since the intensity and color of light of the LCD varies depending on the watching angle. With the aim of increasing the viewing angle, a large amount of research has been carried out.

FIG. 3 is a conceptual view showing a conventional attempt to reduce variation in the contrast ratio and color shift depending on the watching angle.

Referring to FIG. 3, a pixel is divided into two pixel parts, that is, first and second pixel parts 320 and 340, in which the orientations of liquid crystals in the two pixel parts are symmetrical to each other. Both the liquid crystals oriented as shown in the first pixel part 320 and the liquid crystals oriented as shown in the second pixel part 340 can be seen. The intensity of light reaching the viewer is the total intensity of light from the two pixel parts.

When viewed from the front left (310), liquid crystal molecules in the first pixel part 320 look as if they are aligned along the horizontal orientation 312, and liquid crystal molecules in the second pixel part 320 look as if they are aligned along the vertical orientation 314. Thus, the first pixel part 320 makes the screen look bright. Likewise, when viewed from the front right (350), the liquid crystal molecules in the first pixel part 320 look as if they are aligned along the vertical orientation 352, and the liquid crystal molecules in the second pixel part 340 look as if they are aligned along the horizontal orientation 354. Then, the second pixel part 340 can make the screen look bright. In addition, when viewed from the front, the liquid crystal molecules are seen to be aligned along the orientations 332 and 334, which are the same as the actual orientations of the liquid crystal molecules inside the pixel parts 320 and 340. Accordingly, the brightness of the screen observed by the viewer remains uniform and is symmetrical about the vertical center line of the screen, even when the watching angle changes. This, as a result, makes it possible to reduce variation in the contrast ratio and color shift depending on the watching angle.

FIG. 4 is a conceptual view showing another conventional approach for reducing variation in the contrast ratio and color shift depending on the watching angle.

Referring to FIG. 4, an optical film 420 having birefringence characteristics is added. The birefringence characteristics of the optical film 420 are the same as those of liquid crystal molecules inside a pixel 440 of an LCD panel, and the orientation thereof are symmetrical with the orientation of the liquid crystal molecules. Because of the orientation of the liquid crystal molecules inside the pixel 440 and the birefringence characteristics of the optical film, the intensity of light reaching the viewer is the total intensity of light passing through the pixel 440 and the optical film 420.

Specifically, when viewed from the front left (410), the liquid crystal molecules inside the pixel 440 look as if they are aligned along the horizontal orientation 414, and the imaginary liquid crystals of the optical film 420 look as if they are aligned along the vertical orientation 412. The resultant intensity of light is the total intensity of light passing through the pixel 440 and the optical film 420. Likewise, when viewed from the front right (450), the liquid crystal molecules inside the pixel 440 look as if they are aligned along the vertical orientation 454 and the imaginary liquid crystals of the optical film 420 look as if they are aligned along the horizontal orientation 452. The resultant intensity of light is the total intensity of light passing through the pixel 440 and the optical film 420. In addition, when viewed from the front, the liquid crystal molecules are seen to be aligned along the orientations 434 and 432, which are the same as the actual orientation of the liquid crystal molecules inside the pixel 440 and the orientation of the optical film 420, respectively.

However, even if the approaches shown in FIGS. 3 and 4 are applied, there remains the problem as shown in FIG. 5. That is, a color shift still occurs depending on the watching angle, and the color changes as the watching angle increases.

In addition, the optical film and the display device, in particular, a TN mode LCD device of the related art, have problems of gamma-curve distortion and grayscale inversion.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an optical film for a display device, which can reduce color shift depending on a watching angle, and a display device having the same.

Also provided is an optical film for a display device, which can prevent a ghost and haze while reducing color shift, and a display device having the same.

Also provided is an optical film for a display device, which can reduce gamma-curve distortion and grayscale inversion, and a display device having the same.

The technical features of the invention are not limited to the above-described technical objects, and other technical objects not mentioned above will be more fully apparent to a person having ordinary skill in the art from the following description.

In an aspect of the present invention, the optical film for reducing color shift provided in front of a display panel of a display device includes a background layer; and a plurality of lens parts, which are spaced apart from each other, engraved or embossed on the background layer. The lens parts diffuse light incident thereon to mix the diffused light with light passing between the lens parts.

It is preferred that the lens parts have a depth to width ratio of 0.25 or more.

It is preferred that the lens parts have a spacing to pitch ratio ranging from 0.5 to 0.95.

It is preferred that the lens parts have a pitch of 45 μm or less.

In an aspect of the present invention, the display device includes the above-described optical film.

An exemplary embodiment of the invention has the effects of improving the viewing angle and improving the image quality of the display device by minimizing color shift depending on a watching angle.

In addition, an exemplary embodiment of the invention has the effects of preventing a ghost and haze while reducing color shift.

In addition, an exemplary embodiment of the invention has the effect of reducing gamma-curve distortion and grayscale inversion.

The methods and apparatuses of the present invention have other features and advantages which will be apparent from, or are set forth in more detail in the accompanying drawings, which are incorporated herein, and in the following Detailed Description of the Invention, which together serve to explain certain principles of the present invention.

BRIEF DESCRIPTION OF THE DRAWINGS

FIGS. 8 to 11 are cross-sectional views showing lens parts according to second to fifth exemplary embodiments of the invention, respectively;

FIG. 12 is a cross-sectional view showing lens parts according to a sixth exemplary embodiment of the invention;

FIGS. 19 to 24 are views showing the relationship between the cross-sectional shape of lens parts and the occurrence of a ghost;

FIGS. 35 to 38 are views showing the relationship between the size of the lens parts and the occurrence of a ghost;

DETAILED DESCRIPTION OF THE INVENTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Figure 6:
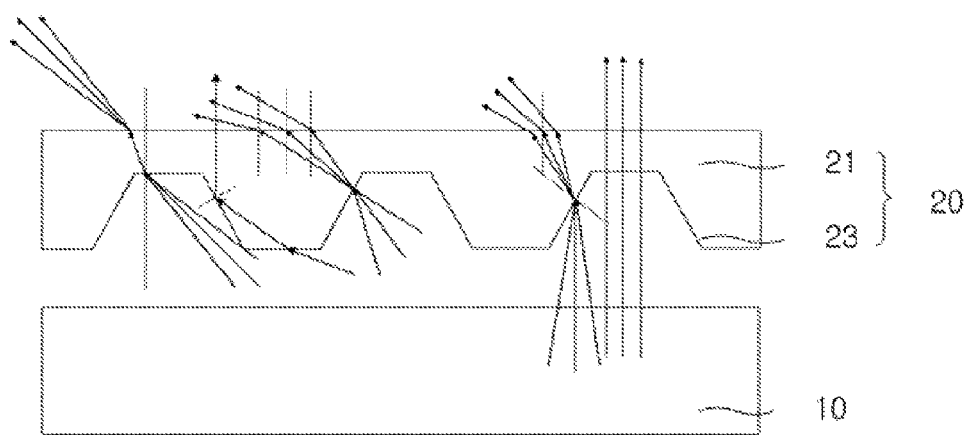
FIG. 6 is a cross-sectional view showing lens parts according to a first exemplary embodiment of the invention.
Figure 7:
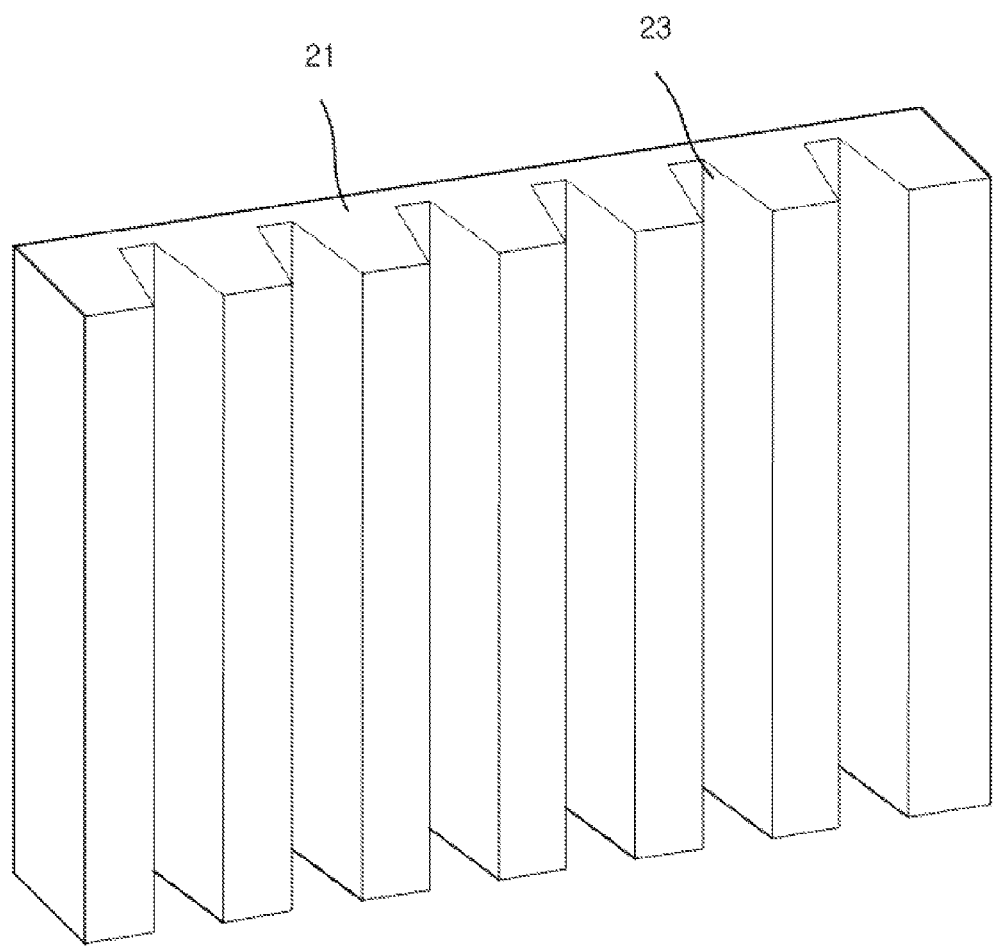
FIG. 7 is a perspective view of the optical film shown in FIG. 6.

FIGS. 6 and 7 are cross-sectional views showing lens parts according to a first exemplary embodiment of the invention.

The optical film is typically provided in front of a display panel 10.

As shown in the figures, the optical film 20 of this embodiment includes a background layer 21 and lens parts 23.

The background layer 21 is formed as a layer of light-transmitting material. The background layer 21 can be made of transparent polymer resin, in particular, Ultraviolet (UV) curing transparent resin.

The lens parts 23 are formed by engraving or embossing the background layer 21 to a predetermined depth or height. The lens parts 23 reduce color shift by refracting light incident thereon. The lens parts 23 can reduce color change that occurs depending on a watching angle, by using color mixing effect. It is possible to allow more light emitted in the direction normal to a display panel to pass through by reducing the width thereof to be smaller than the spacing thereof.

The lens parts serve to change the direction of light emitted in the direction normal to the display panel, away from the normal direction, and change the direction of light diverged from the normal direction, toward the normal direction. That is, the lens parts can cause color mixing by changing the direction of light, depending on the watching angle, thereby reducing color shift.

The lens parts 23 can have a pattern selected from among stripes having a wedge-shaped cross section, waves having a wedge-shaped cross section, a matrix having a wedge-shaped cross section, a honeycomb having a wedge-shaped cross section, dots having a wedge-shaped cross section, stripes having a quadrangular cross section, waves having a quadrangular cross section, a matrix having a quadrangular cross section, a honeycomb having a quadrangular cross section, dots having a quadrangular cross section, stripes having a semicircular cross section, waves having a semicircular cross section, a matrix having a semicircular cross section, a honeycomb having a semicircular cross section, dots having a semicircular cross section, stripes having a semi-elliptical cross section, waves having a semi-elliptical cross section, a matrix having a semi-elliptical cross section, a honeycomb having a semi-elliptical cross section, dots having a semi-elliptical cross section, stripes having a semi-oval cross section, waves having a semi-oval cross section, a matrix having a semi-oval cross section, a honeycomb having a semi-oval cross section, and dots having a semi-oval cross section. (Here, the wedge-like cross section includes a trapezoidal or triangular cross section. In addition, the semi-oval cross section may have a parabolic outline. Further, the terms "semi-circular cross section," "semi-elliptical cross section," or "semi-oval cross section" are not limited to the shapes that are obtained by dividing circular, elliptical, or oval shapes precisely into two sections, but include shapes in which part of the outline of the cross section of the lens parts includes an arc, an elliptical arc, or a parabola. That is, "semi-elliptical cross section" may have a shape that has two elliptical arc lateral sides and a linear upper (or lower) side.)

The present invention is not limited thereto but can include a variety of shapes. It is preferred that the cross section be horizontally symmetrical.

In addition, the pattern constituted of stripes can also include a variety of patterns, such as a horizontal stripe pattern, a vertical stripe pattern, and the like. The horizontal stripe pattern is effective in compensating for vertical watching angle. The vertical stripe pattern, as shown in FIG. 7, is effective in compensating for horizontal watching angle.

In order to prevent a moiré phenomenon, the lens parts 23 can be formed to have a predetermined bias angle with respect to the edge of the background layer 21. For example, in the stripe pattern, the stripes can have a predetermined angle of inclination with respect to the horizontal or vertical direction.

It is preferred that the lens parts 23 is in the form of recesses which have a wedge-shaped cross section and are periodically formed on one surface of the background layer 21, as shown in FIG. 7. The recesses are spaced apart from each other and parallel to each other.

The lens parts can be formed on the surface that faces the viewer or the display panel, or can be formed on both surfaces of the background layer 21.

Figure 14:
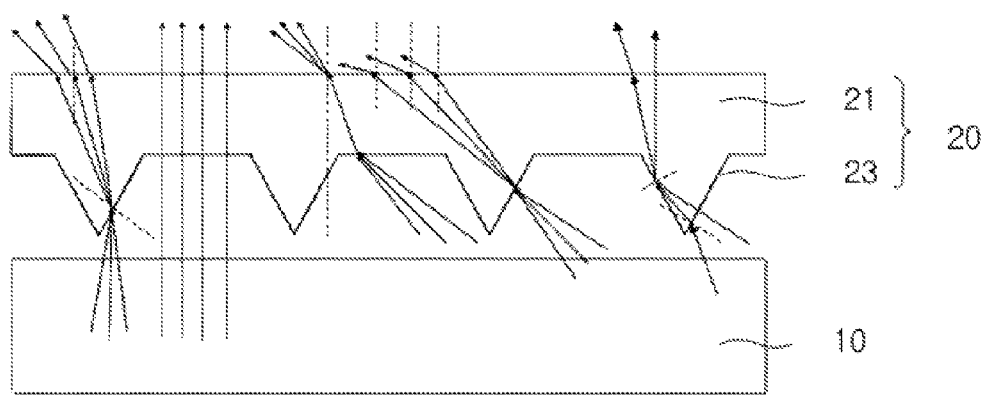
FIG. 14 is a cross-sectional view showing lens parts according to a seventh exemplary embodiment of the invention.

Although FIG. 6 shows an embodiment in which the lens parts 23 are formed by engraving the background layer 21, the present invention is not limited thereto. Embossed lens parts 23 can be provided as shown in FIG. 14.

Figure 8:
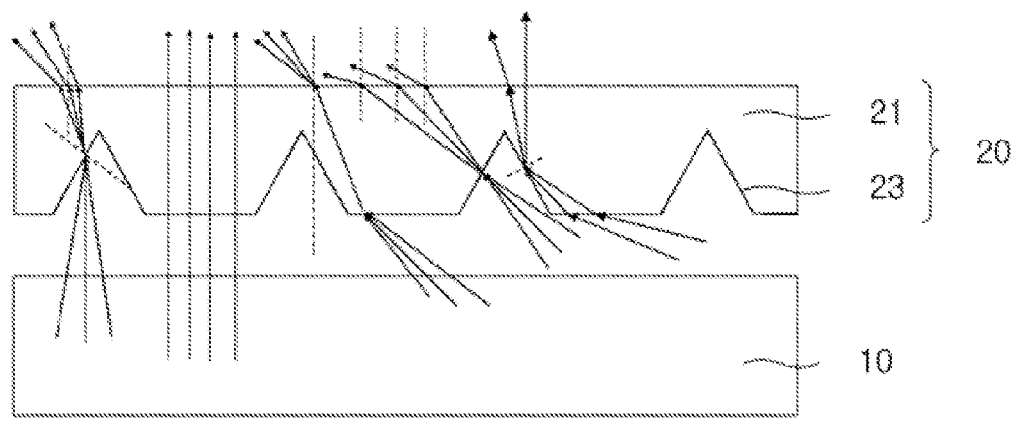
Figure 9:
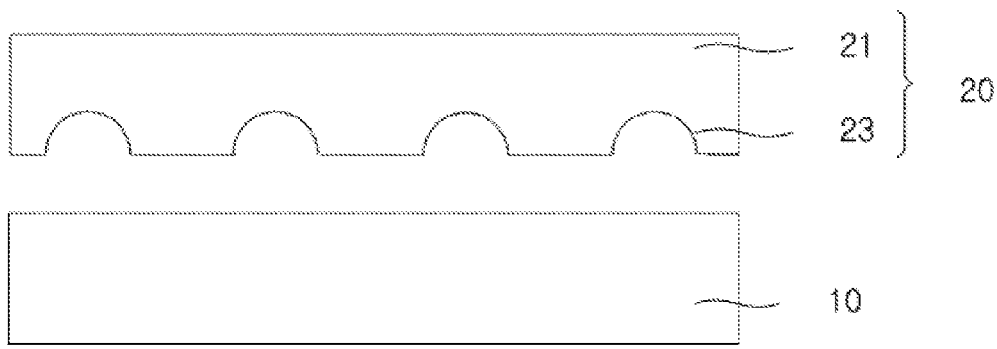

FIG. 8 is a cross-sectional view showing lens parts according to a second exemplary embodiment of the invention, and FIG. 9 is a cross-sectional view showing lens parts according to a third exemplary embodiment of the invention.

These figures show that the lens parts can have a triangular or semicircular cross section.

Figure 10:
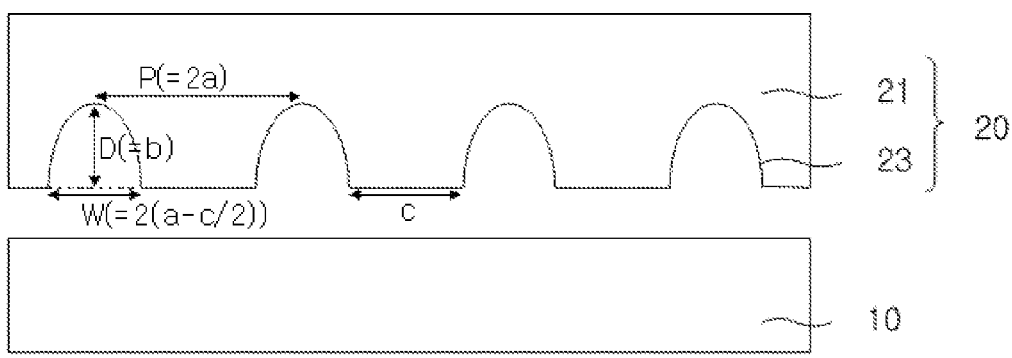

FIGS. 10 and 11 are cross-sectional views showing lens parts according to fourth and fifth exemplary embodiments of the invention.

Although the lens parts can be formed on the rear surface of the background layer, which faces the display panel, they can alternatively be formed on the front surface of the background layer, which faces the viewer.

Figure 13:
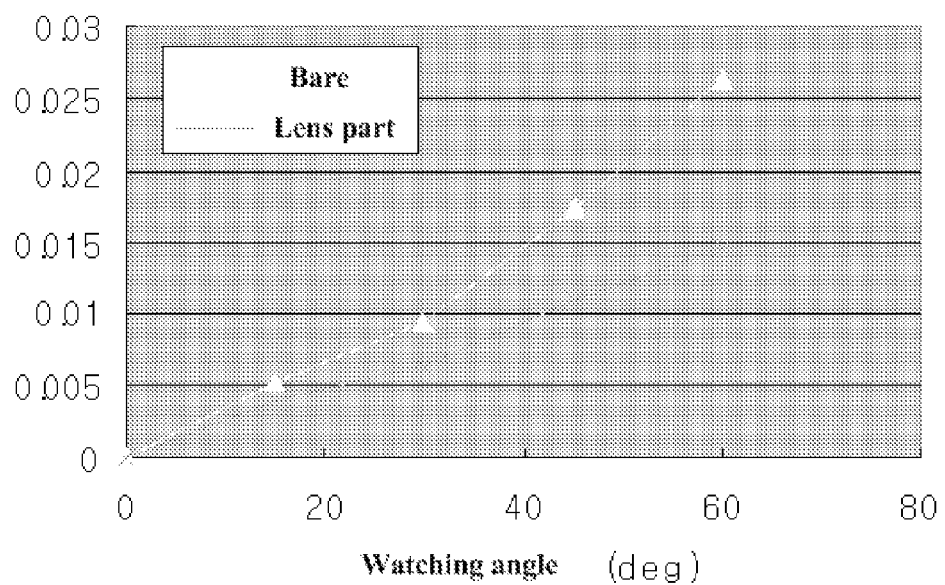
FIG. 13 is a graph showing the color shift-reducing effect of the optical film shown in FIG. 12.

FIG. 12 is a cross-sectional view showing lens parts according to a sixth exemplary embodiment of the invention, and FIG. 13 is a graph showing the color shift-reducing effect of the optical film shown in FIG. 12.

As shown in the figures, the lens parts can be formed on both surfaces of the background layer.

The optical film, which includes the background layer and the lens parts on both surfaces of the background layer, was manufactured. The background layer had a refractive index of 1.5 and a thickness of 100 μm. Each of the lens parts had a semicircular cross section, a width (i.e., the diameter of a semicircle) of 30 μm, and a spacing of 90 μm. The color shift of a full white screen depending on a watching angle was measured, and thereby the result shown in FIG. 13 was obtained.

As shown in the figures, in the case in which the optical film of this embodiment is applied, the color shift depending on a watching angle is considerably reduced compared to the case in which the optical film of this embodiment is not applied.

FIG. 14 is a cross-sectional view showing lens parts according to a seventh exemplary embodiment of the invention.

As shown in FIG. 14, the embossed lens parts can be provided.

Figure 15:
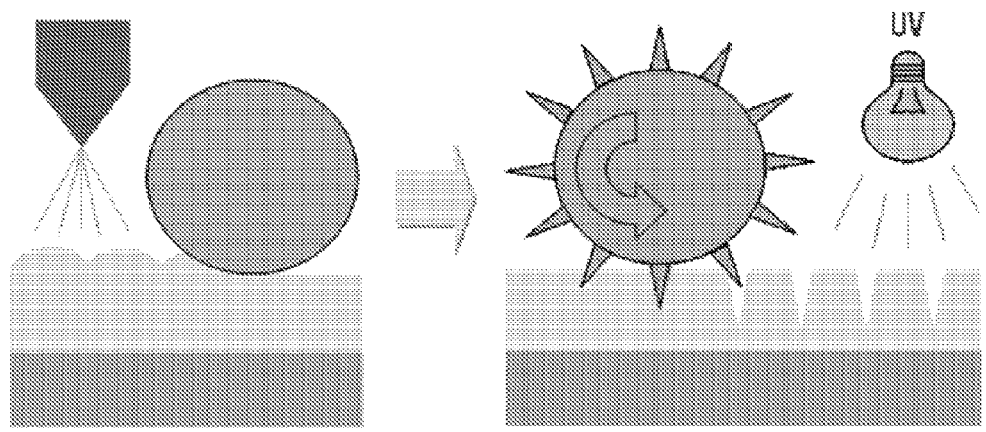
FIG. 15 is a cross-sectional view showing a method of manufacturing an optical film according to an eighth exemplary embodiment of the invention.

FIG. 15 is a cross-sectional view showing a method of manufacturing an optical film according to an eighth exemplary embodiment of the invention.

The optical film for reducing color shift can include a backing (i.e., a support in FIG. 15) which supports the background layer 21.

Preferably, the backing may be a transparent resin film or a glass substrate that allows Ultraviolet (UV) rays to pass through. For the material for the backing, it is possible to use, for example, Polyethylene Terephthalate (PET), Polycarbonate (PC), Polyvinyl Chloride (PVC), or the like.

A method of preparing the lens parts 23 includes the steps of applying a UV curing resin on one surface of the backing, and forming recesses on the UV curing resin using a forming roll which has a reverse pattern to the lens parts on the surface thereof. Afterwards, the preparation of the background layer 21 having the lens parts 23 is completed by radiating UV rays onto the UV curing resin.

However, the invention is not limited thereto. Alternatively, the recesses of the background layer can be formed using a variety of methods, such as thermal pressing, which uses thermoplastic resin, injection molding, in which thermoplastic resin or thermosetting resin is injected, or the like.

The optical filter for a display device according to an exemplary embodiment of the invention can be formed as a single optical film having a background layer and lens parts. Alternatively, the optical filter can be formed as a multilayer optical filter, in which a variety of functional films, such as a transparent substrate for protecting the panel, an anti-fog layer, an antireflection layer, a polarizer film, and a phase retardation film, are stacked on the optical film.

Figure 16:
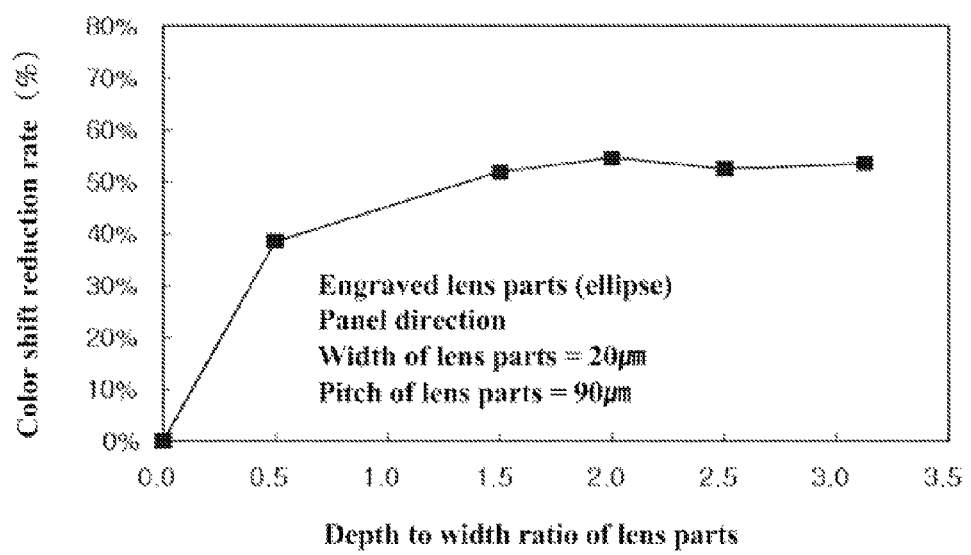
FIG. 16 is a graph showing the relationship between the depth to width ratio of the lens parts and the rate of color shift reduction.

In this case, the individual layers (or films) of the optical filter can be adhered or bonded using an adhesive or a bonding agent. Specific materials thereof may include acrylic adhesives, silicone-based adhesives, urethane-based adhesives, polyvinyl butyral (PMB) adhesives, Ethylene Vinyl Acetate (EVA)-based adhesives, Polyvinyl Ether (PVE), saturated amorphous polyester, melamine resins, and the like FIG. 16 is a graph showing the relationship between the depth (D) to width (W) ratio of the lens parts and the rate of color shift reduction.

The degree of color shift Δu'v' that is discernible with the human eye is 0.004 or more. An S-IPS display panel having the best color shift characteristics exhibits a maximum color shift Δu'v' of 0.02 at watching angles ranging from 0 degree to 60 degrees. Therefore, the rate of color shift reduction is required to be 20% or more (that is, maximum Δu'v' is required to be 0.016 or less) in order to attain a reduction in color shift that is discernible with the human eye. It can be appreciated from the graph of FIG. 16 that the depth to width ratio of the lens parts is required to be 0.25 or more in order for the color shift reduction to be 20% or more. In addition, if the depth to width ratio of the lens parts exceeds 6, it is impossible to manufacture the film using a common method of forming lens parts. Therefore, the depth to width ratio of the lens parts is required to be 6 or less.

Figure 17:
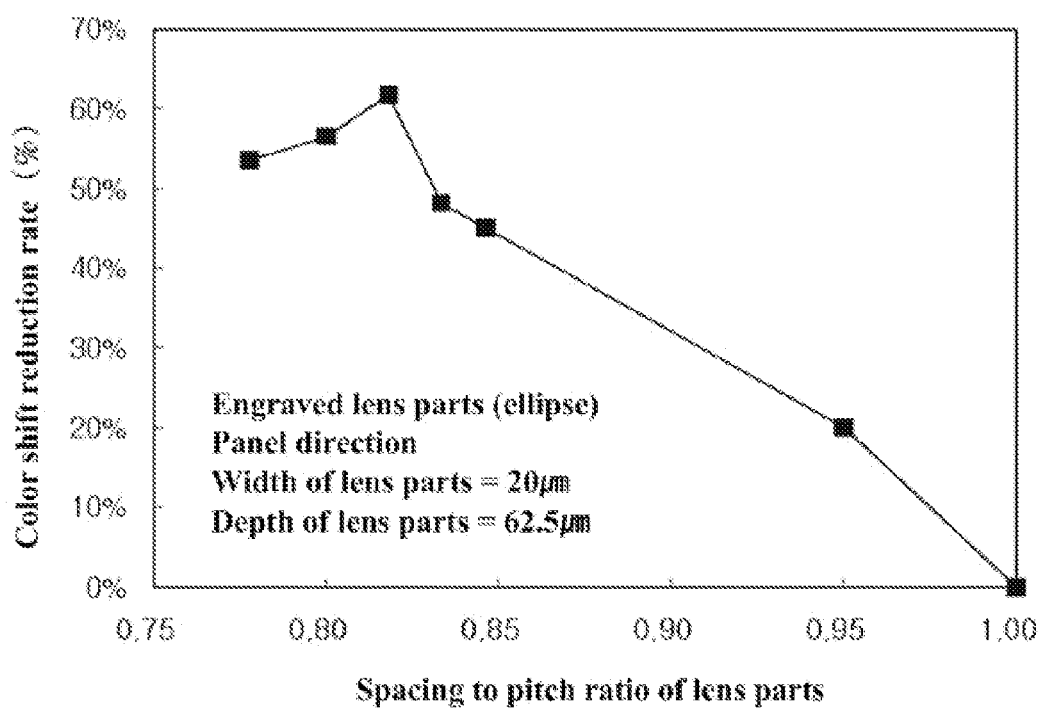
FIG. 17 is a graph showing the relationship between the spacing to pitch ratio of the lens parts and the rate of color shift reduction.

FIG. 17 is a graph showing the relationship between the spacing (c) to pitch (P) ratio of the lens parts and the rate of color shift reduction.

Likewise, the spacing to pitch ratio of the lens parts (i.e., the ratio of the spacing between the lens parts with respect to the pitch of the lens parts) is required to be 0.95 or less in order for the color shift reduction to be 20% or more.

Figure 18:
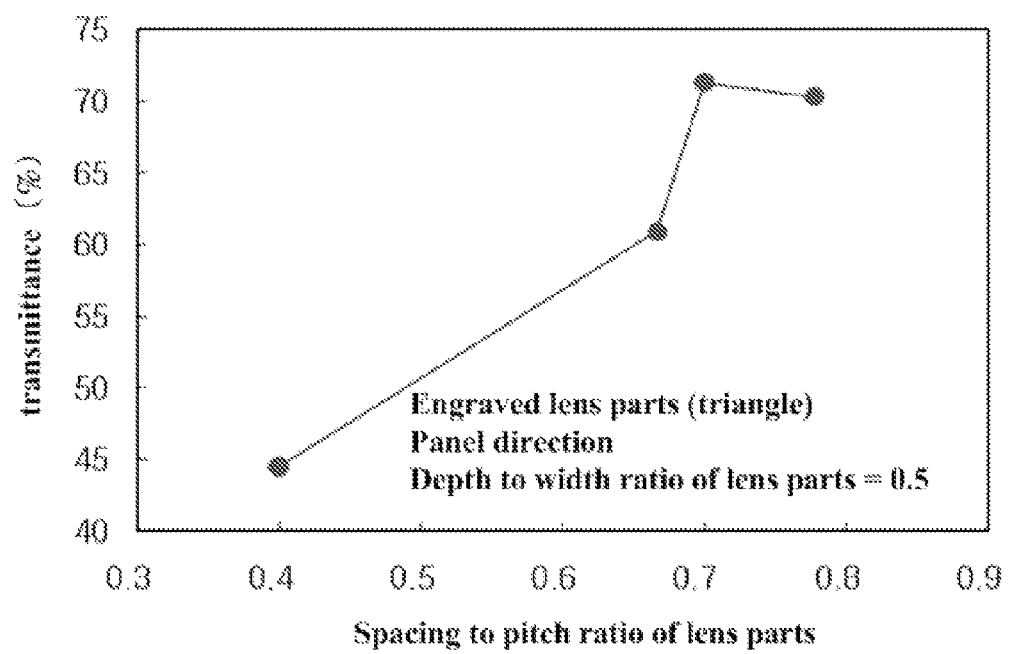
FIG. 18 is a graph showing the relationship between the spacing to pitch ratio of the lens parts and transmittance.

FIG. 18 is a graph showing the relationship between the spacing (C) to pitch (P) ratio of the lens parts and transmittance.

As shown in the graph of FIG. 18, the light transmittance of the film depends on the spacing to pitch ratio of the lens parts. The film having the light transmittance below 50% is worthless as a commercial product. Accordingly, the spacing to pitch ratio of the lens parts is required to be 0.5 or more in order for the transmittance to be 50% or more.

Therefore, it can be appreciated that, from the graphs shown in FIGS. 17 and 18, the spacing to pitch ratio of the lens parts ranges preferably from 0.5 to 0.95.

FIGS. 19 to 24 are views showing the relationship between the cross-sectional shape of lens parts and a double image.

Figure 19:
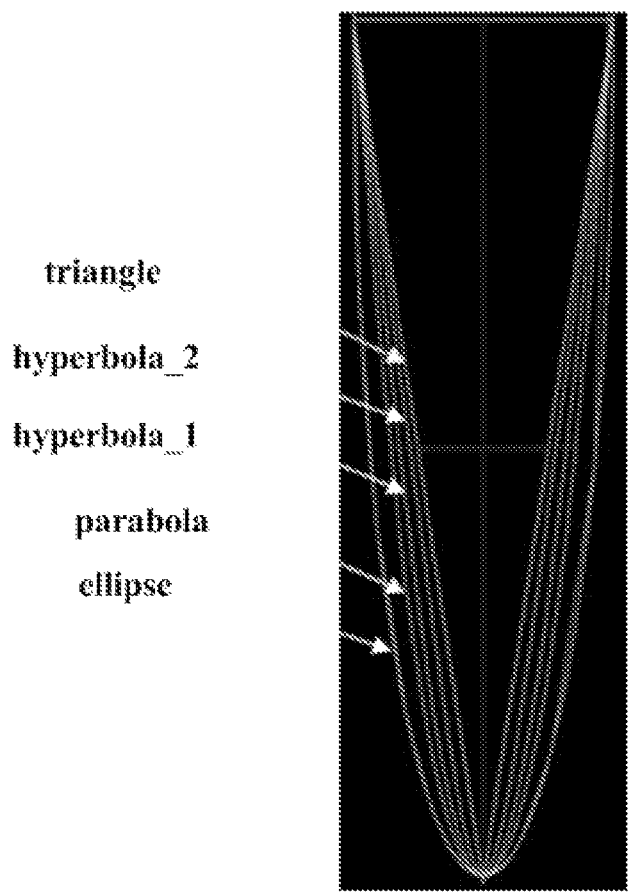
Figure 20:
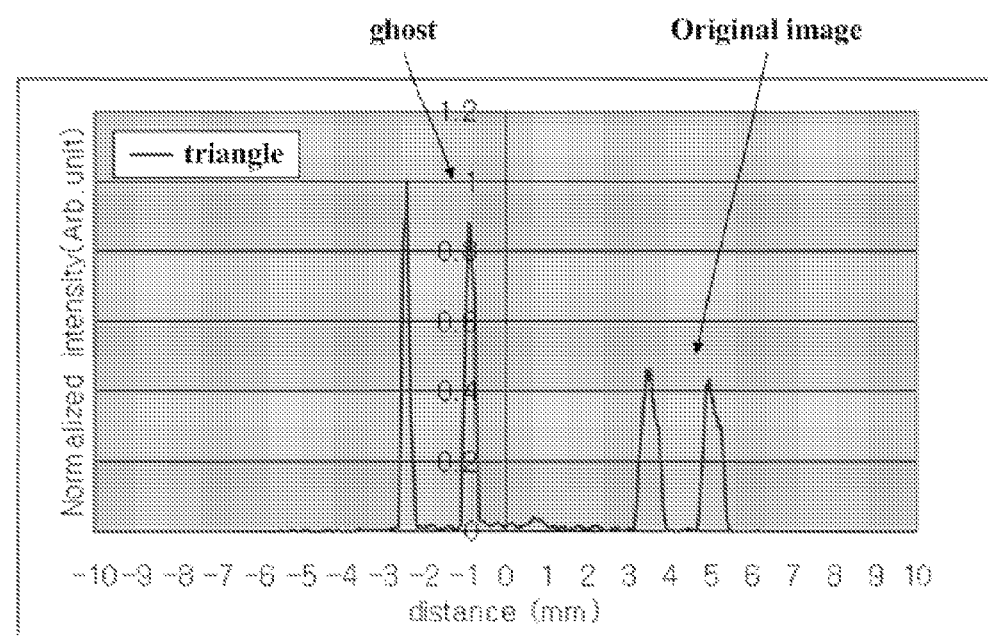
Figure 21:
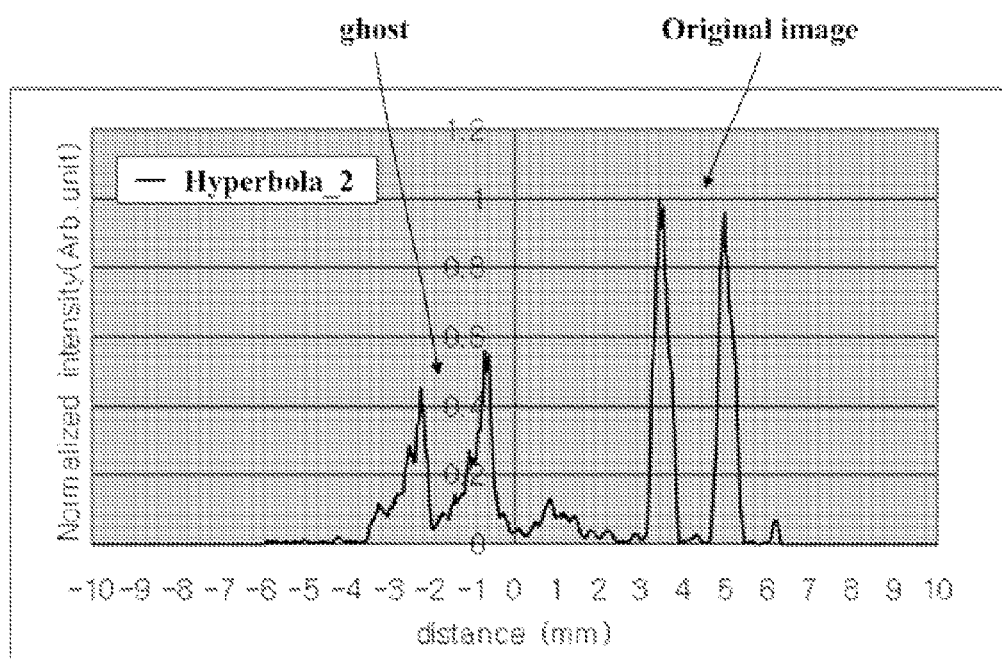
Figure 2:
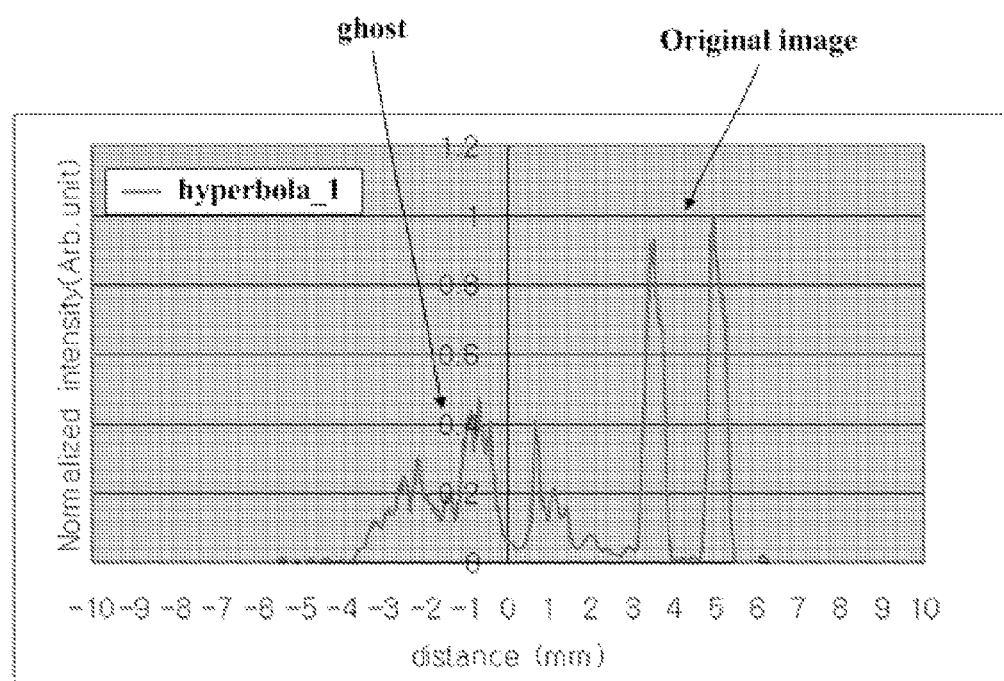
Figure 23:
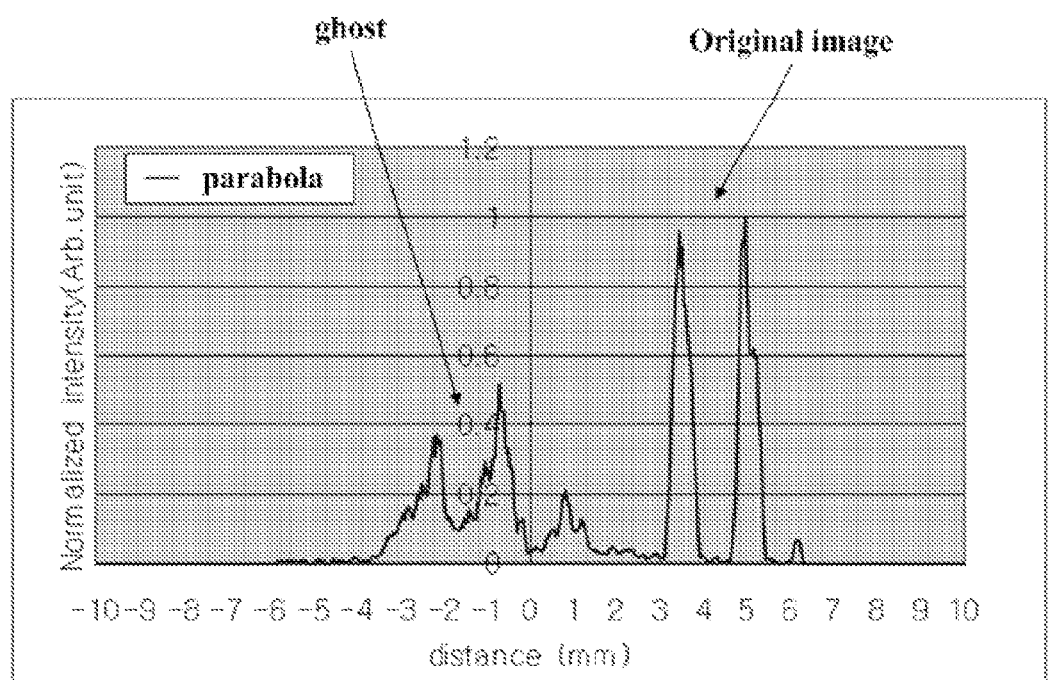
Figure 24:
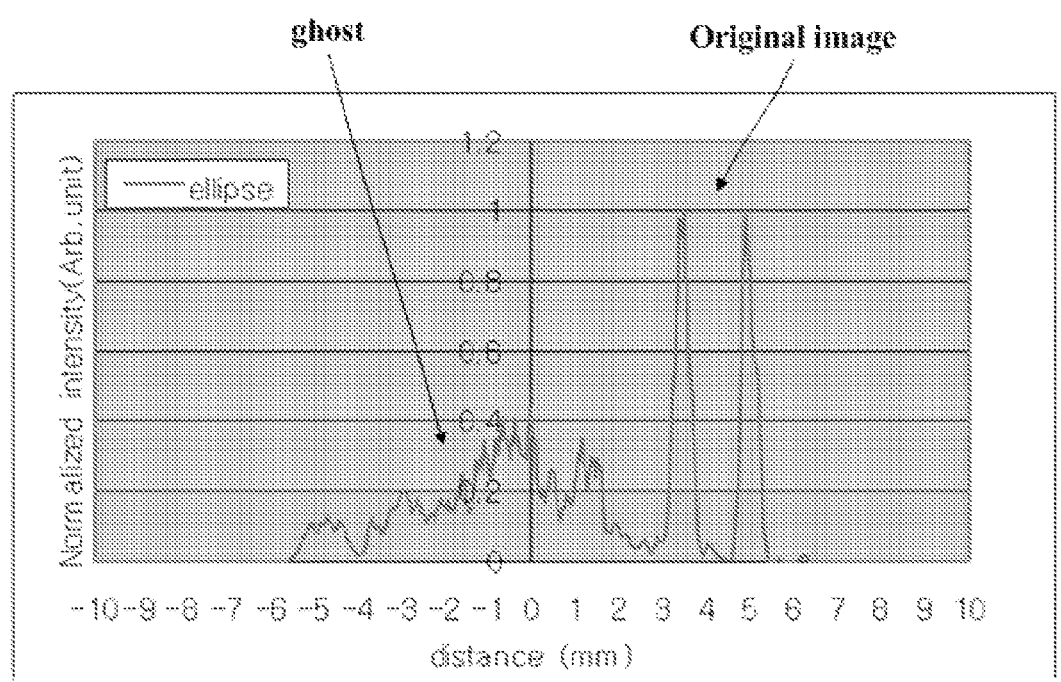

The occurrence of a ghost was observed while varying the curvature of the lens parts (having a width of 27 μm, a depth of 81 μm, and a pitch of 90 μm). As shown in FIG. 19, it can be appreciated that lens parts having a semi-elliptical cross section most effectively prevent the ghost.

The ghost (false image) is observed more distinctly as the shape is changed from a semi-elliptical shape to a triangular shape, that is, the curvature decreases. FIGS. 20 to 24 are graphs showing the luminance distributions of the ghosts compared with those of original images.

Figure 25:
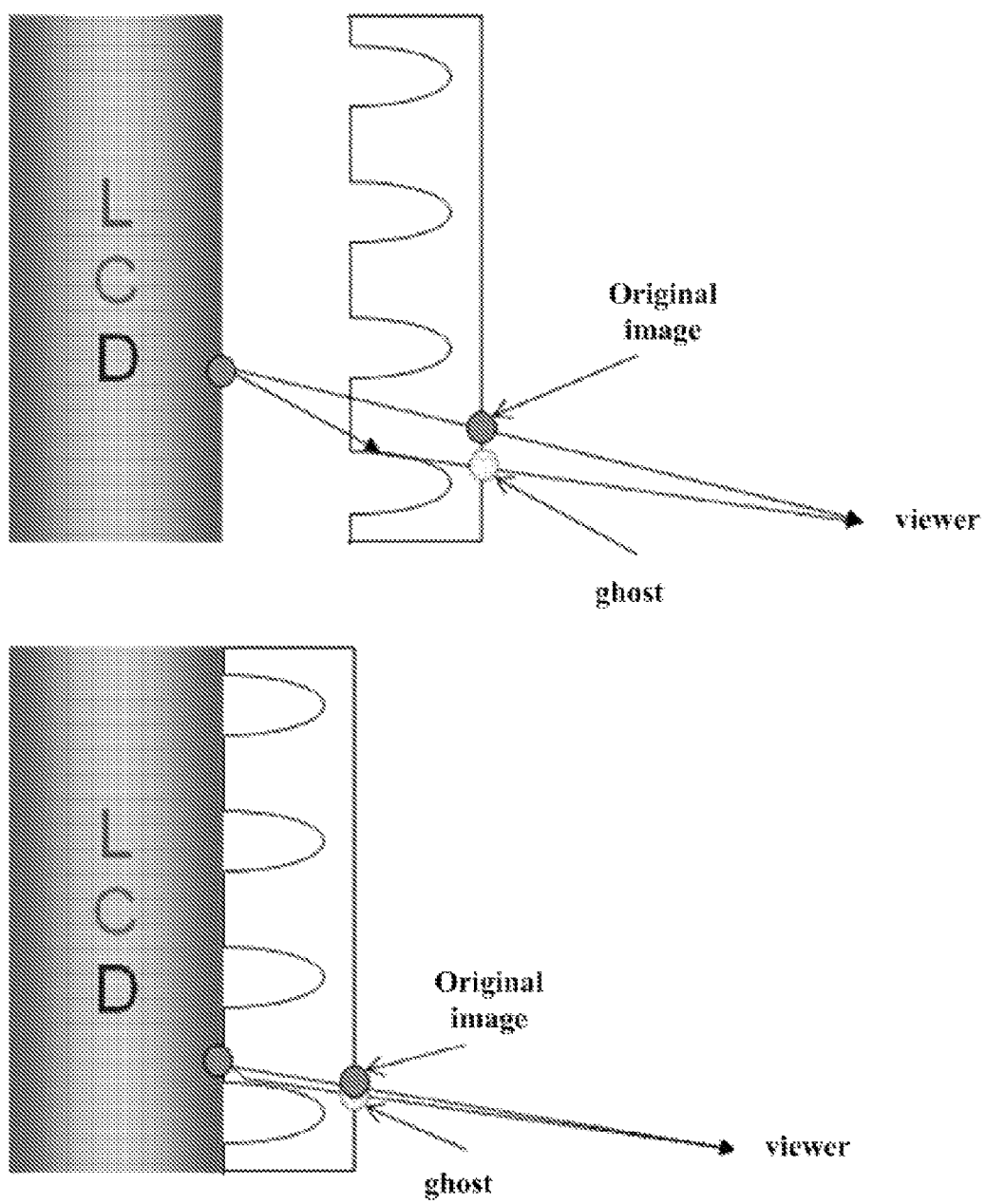
FIGS. 25 and 26 are views showing that a ghost and haze occur when the optical film for reducing color shift is provided such that it is spaced apart from the display panel.
Figure 26:
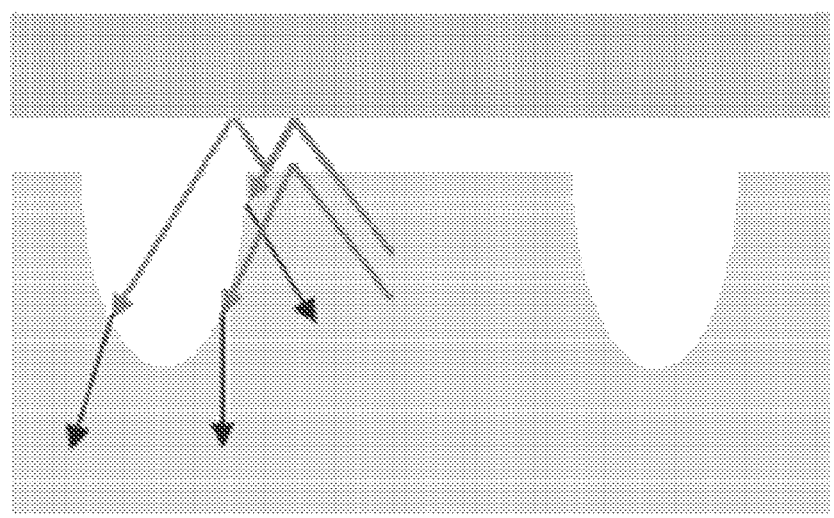

FIGS. 25 and 26 are views showing that a ghost and haze occur when the optical film for reducing color shift is provided such that it is spaced apart from the display panel.

When the optical film for reducing color shift of this embodiment is mounted in front of the display panel, the ghost looks more distinctly as the optical film is spaced farther apart from the display panel, as shown in FIG. 25. (When the optical film is in close contact with the display panel, it is difficult to distinguish the ghost from the original image because the gap between the ghost and the original image is very small, as will be described below.) The ghost distorts the image on the display panel. Therefore, a solution that can reduce color shift without causing a ghost is required.

In addition, if the optical film for reducing color shift is provided such that it is spaced apart from the display panel, not only the foregoing problem of a ghost, but also the problem of haze occurs, as shown in FIG. 26, since the lens parts diffuse lights reflected from the display panel and the flat surfaces between the lens parts. That is, light entering onto the optical film and the display panel is reflected or multiple-reflected from the interface between the optical film and the air and from the interface between the air and the display panel and then is incident onto the lens parts. The lens parts diffuse the incident light and thereby haze occurs. This phenomenon reduces bright room contrast ratio, thereby lowering visibility. Therefore, a solution that can prevent a ghost and haze from occurring in the display device having the optical film for reducing color shift is required.

Figure 27:
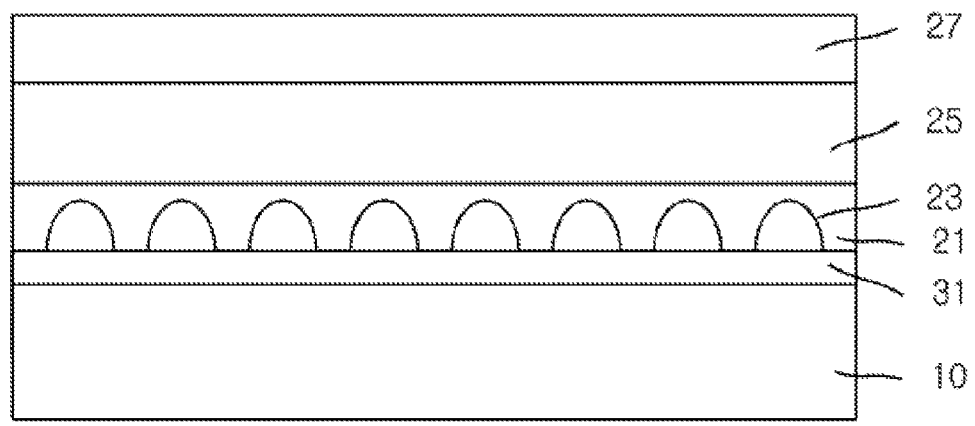
FIGS. 27 and 28 are cross-sectional views schematically showing display devices according to ninth and tenth embodiments of the invention, which are designed to remove a ghost and haze due to an optical film for reducing color shift according to an exemplary embodiment of the invention.
Figure 28:
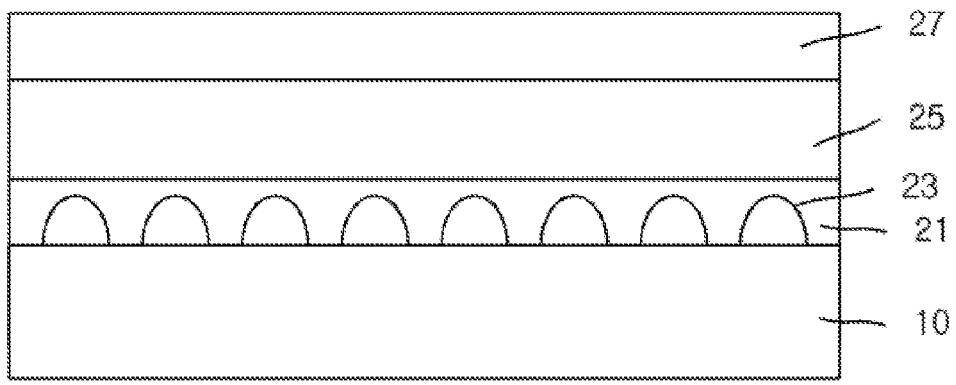

FIGS. 27 and 28 are cross-sectional views schematically showing display devices according to ninth and tenth embodiments of the invention, which are designed to remove a ghost and haze due to the optical film for reducing color shift.

It is possible to remove a ghost and haze by bringing the optical film into close contact with the display panel. For example, in exemplary embodiments of the invention, it is possible to prevent a ghost and haze and improve transmittance by attaching the optical film for reducing color shift to the display panel by means of an adhesive as shown in FIG. 27, or by attaching a background layer of a material having self-adhesive property directly to the display panel. In addition, it is also possible to simply bring the optical film into close contact with the display panel without adhering it thereto such that no air layer is interposed between the optical film and the display panel.

In this case, it is preferred that the lens parts face the display panel in order to reduce haze. (This is the same as in the case in which the optical film for reducing color shift is provided such that it is spaced apart from the display panel.)

Here, the background layer having self-adhesive property can be made of UV curing transparent elastomer and can be easily attached directly to the display panel. The available materials of the background layer may include acrylic elastomer, silicone-based elastomer (Polydimethylsiloxane: PDMS), urethane-based elastomer, polyvinyl butyral (PMB) elastomer, Ethylene Vinyl Acetate (EVA)-based elastomer, Polyvinyl Ether (PVE)-based elastomer, saturated amorphous polyester-based elastomer, melamine resin-based elastomer, and the like.

Reference numeral 25, which has not been explained, indicates a backing that supports the background layer 21. The backing may be a glass substrate. In addition, reference numeral 27, which has not been explained, indicates an anti-reflection layer.

Figure 29:
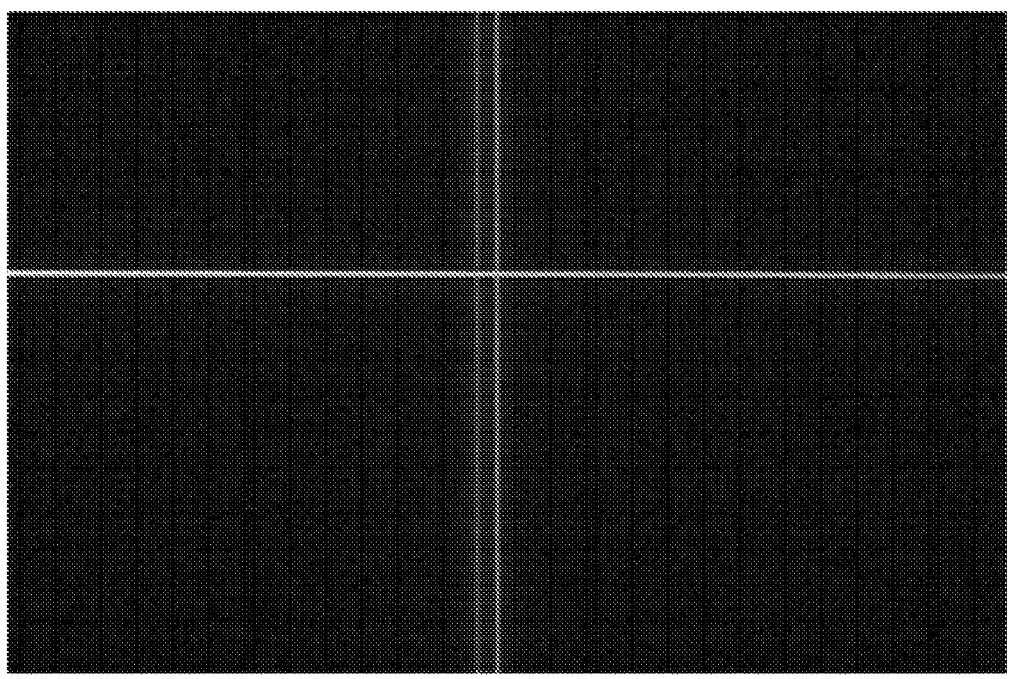
FIG. 29 is a view showing that a ghost occurs when an optical film for reducing color shift is provided such that it is spaced apart from the display panel.
Figure 30:
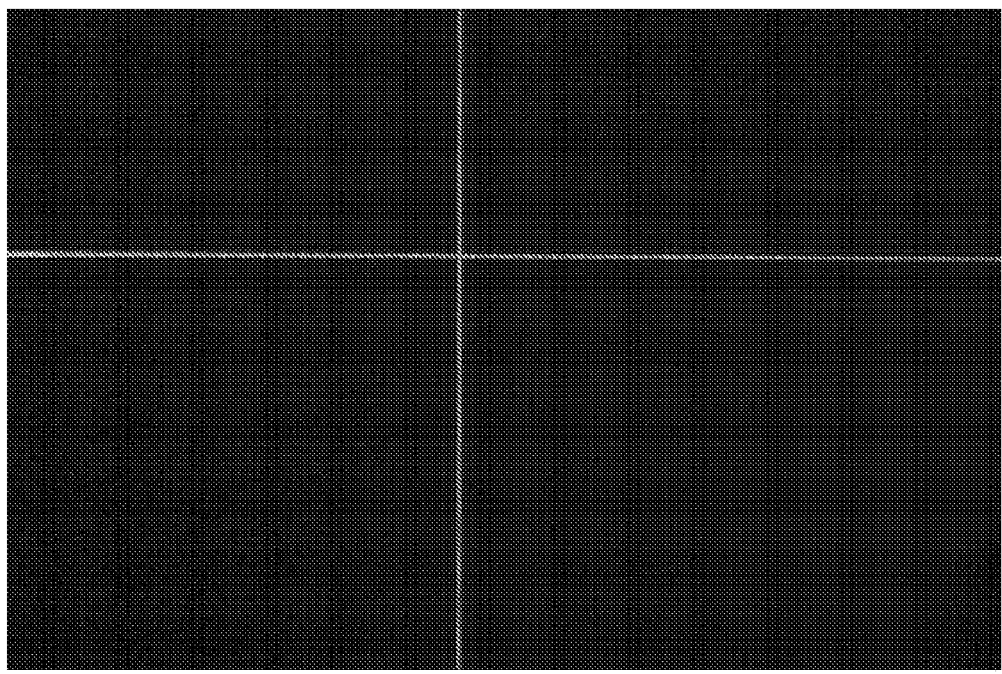
FIG. 30 is a view showing that the display device shown in FIG. 27 removes a ghost.

FIG. 29 is a view showing that a ghost occurs when the optical film for reducing color shift is provided such that it is spaced apart from the display panel, and FIG. 30 is a view showing that a ghost is removed from the display device shown in FIG. 27.

Table 1 below presents the results obtained by measuring haze in a display device in which the optical film for reducing color shift is provided such that it is spaced apart from the display panel, and in the display device shown in FIG. 27.

TABLE 1

| Sample | Luminance measured at watching angle of 60° |
|---|---|
| Black panel | 1.73 nit |
| Display panel/Air/Film having lens parts with semielliptical cross section | 12.27 nit |
| Display panel/PSA/Film having lens parts with semielliptical cross section | 2.58 nit |
| Display panel/Air/PET Film | 3.87 nit |

Measurement was carried out using illuminant D65 of 240 lux as an external light source. The samples were attached to black substrates, and the luminance of reflecting light was measured at the horizontal watching angle of 60°. Since the external light source exists at a place higher than the samples, specular reflection could be observed from below the samples, and irregular reflection could be observed from all directions. Therefore, the reflection haze caused by external light was measured by detecting irregularly-reflected light at a horizontal watching angle of 60° rather than from below the samples.

In the case in which the optical film for reducing color shift was adhered to (or directly attached) to the display panel, the reflection haze was measured to be 2.58 nit, which is very small compared to the case in which the optical film was spaced apart from the display panel, thereby allowing an air layer therebetween. It can be appreciated that the reflection haze was significantly reduced even in comparison with the case in which the simple PET film without the lens parts is used.

Figure 31:
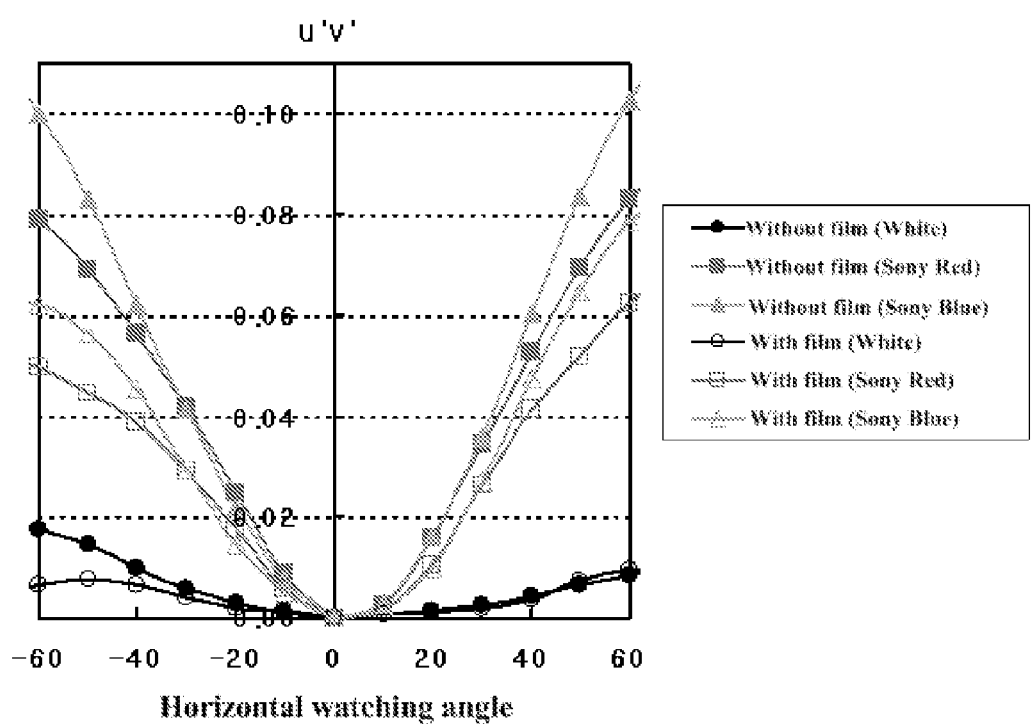
FIG. 31 is a graph showing the result obtained by measuring color shift (Δu'v') depending on the horizontal watching angles in the display device shown in FIG. 27.

FIG. 31 is a graph showing the result obtained by measuring color shift (Δu'v') depending on the horizontal watching angles in the display device shown in FIG. 27.

As shown in FIG. 31, the display device shown in FIG. 27 can reduce color shift.

Figure 1:
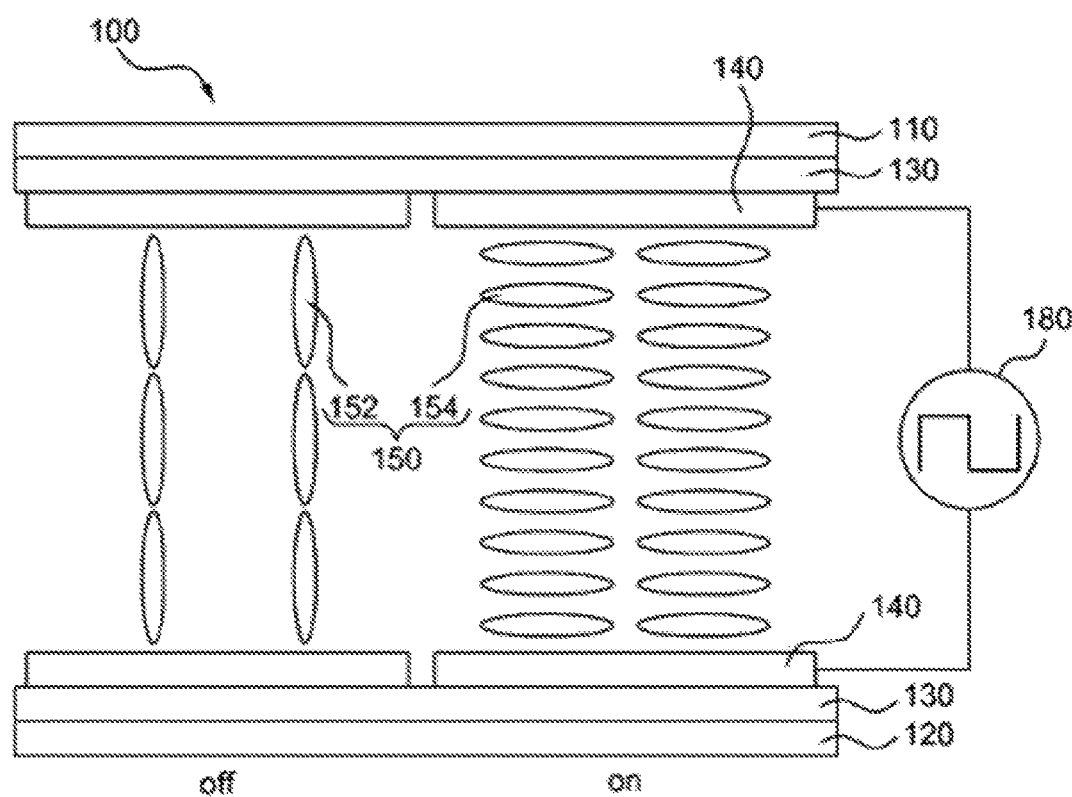
FIG. 1 is a conceptual view schematically showing the basic structure and operating principle of an LCD.
Figure 2:
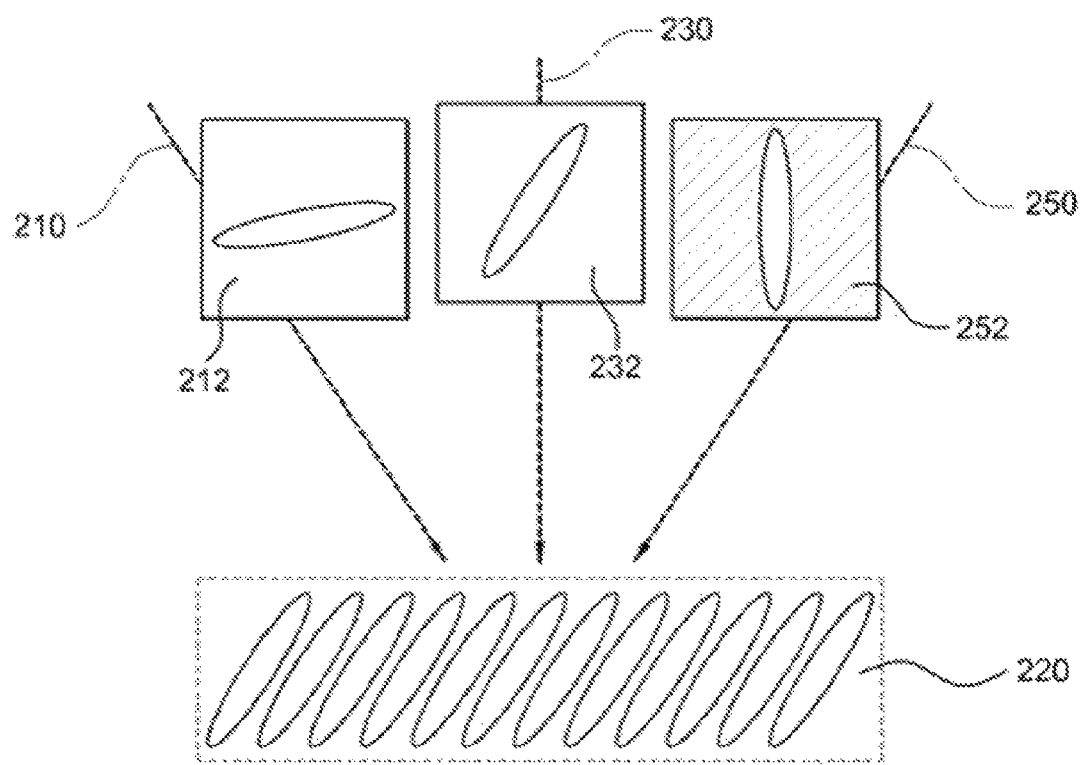
FIG. 2 is a conceptual view showing the orientation and optical transmittance of liquid crystals depending on the watching angle.
Figure 3:
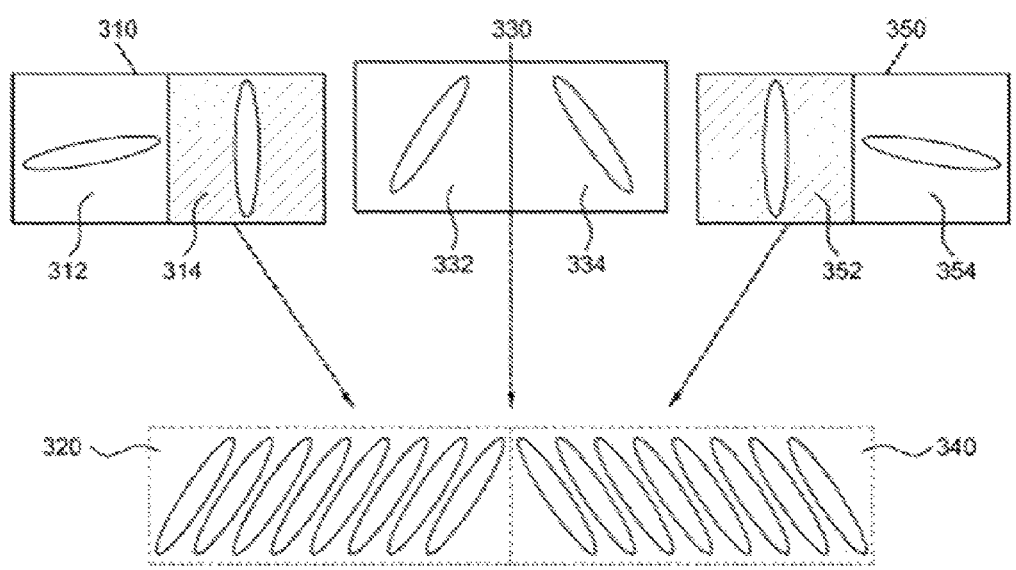
FIG. 3 is a conceptual view showing a conventional attempt to reduce variation in the contrast ratio and color shift depending on the watching angle.
Figure 4:
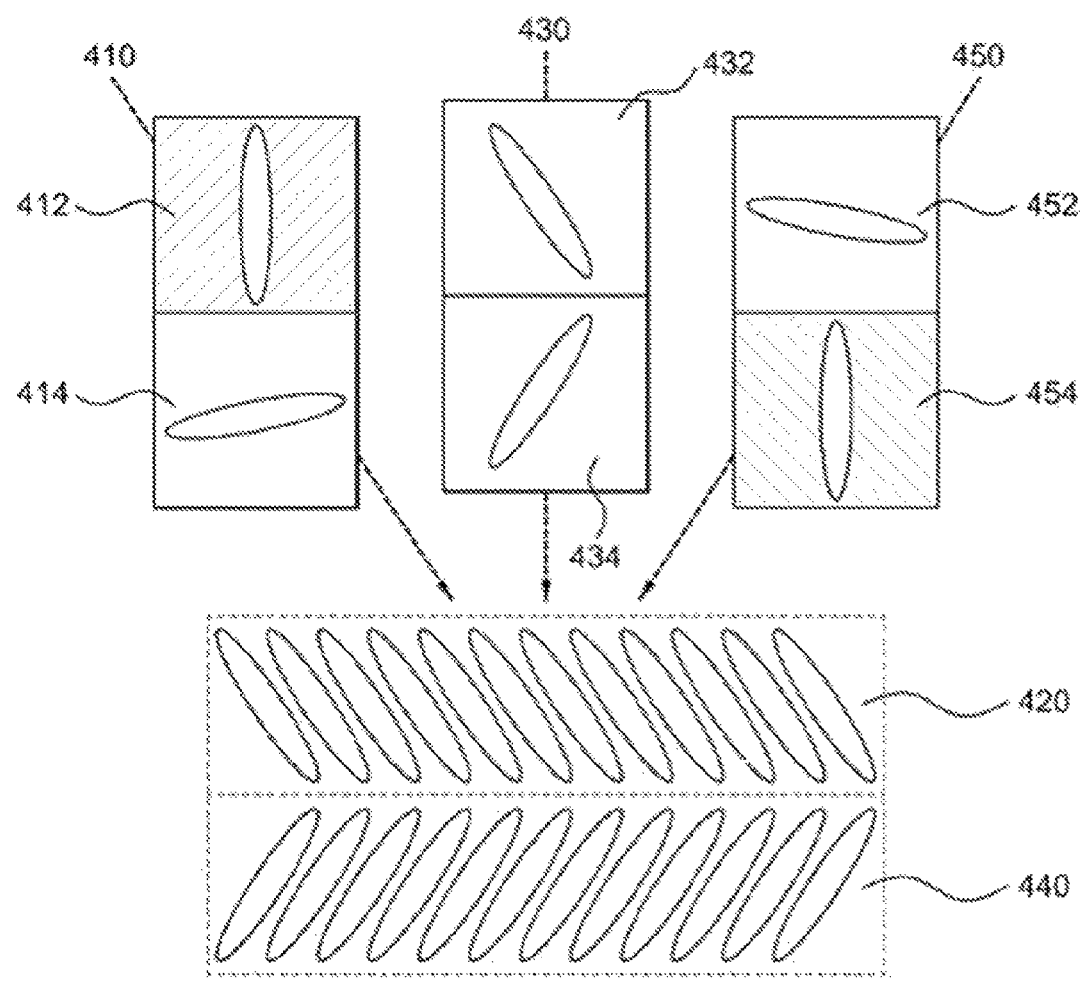
FIG. 4 is a conceptual view showing another conventional attempt to reduce variation in the contrast ratio and color shift depending on the watching angle.
Figure 5:
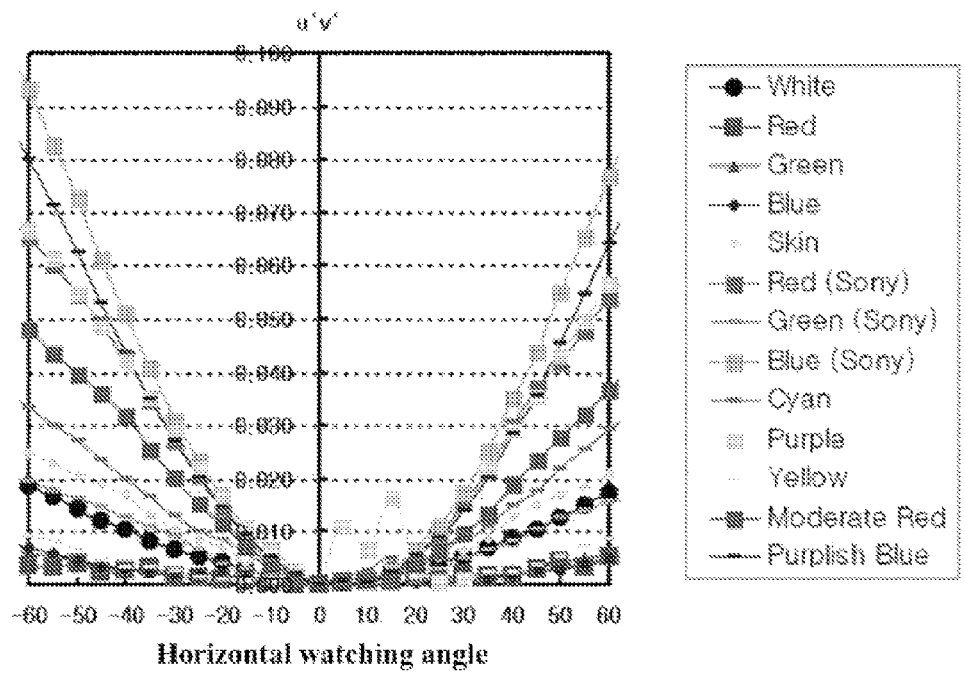
FIG. 5 is a graph showing color shifts depending on watching angles in an LCD without the optical filter of the invention.
Figure 32:
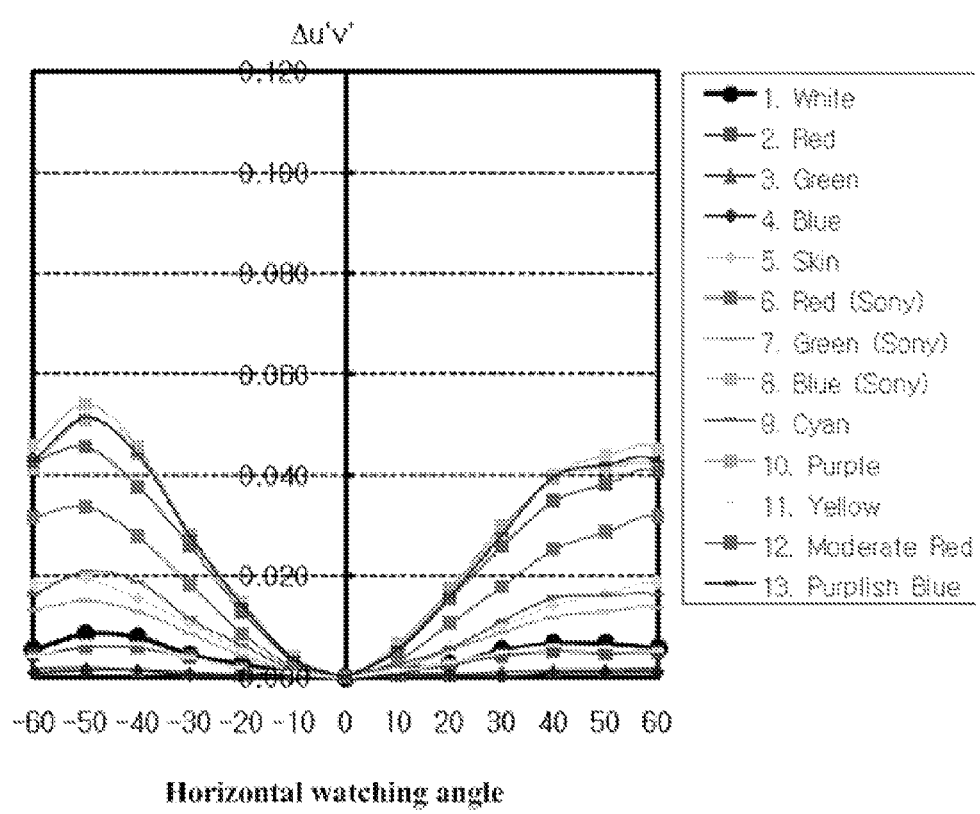
FIG. 32 is a graph showing the result obtained by attaching a self-adhesive optical film for reducing color shift to the display panel in the S-PVA mode LCD TV of FIG. 5 and then measuring the rate of color shift reduction.

FIG. 32 is a graph showing the result obtained by attaching a self-adhesive optical film for reducing color shift (lens parts have a semielliptical cross section with a width of 30 μm, a depth of 60 μm, and a pitch of 83 μm) to the display panel in the S-PVA mode LCD TV of FIG. 5 and then measuring the rate of color shift reduction.

The color shift reduction rate in FIG. 32 was 52%.

Figure 33:
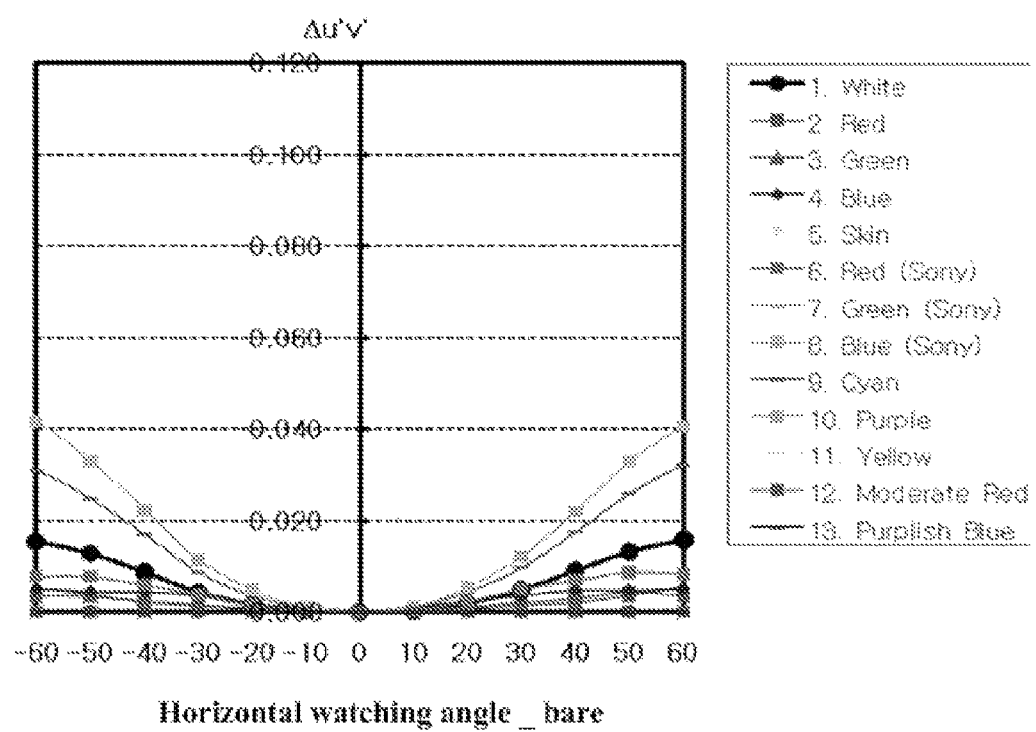
FIG. 33 is a graph showing color shift in an S-IPS mode LCD TV without an optical film for reducing color shift.
Figure 34:
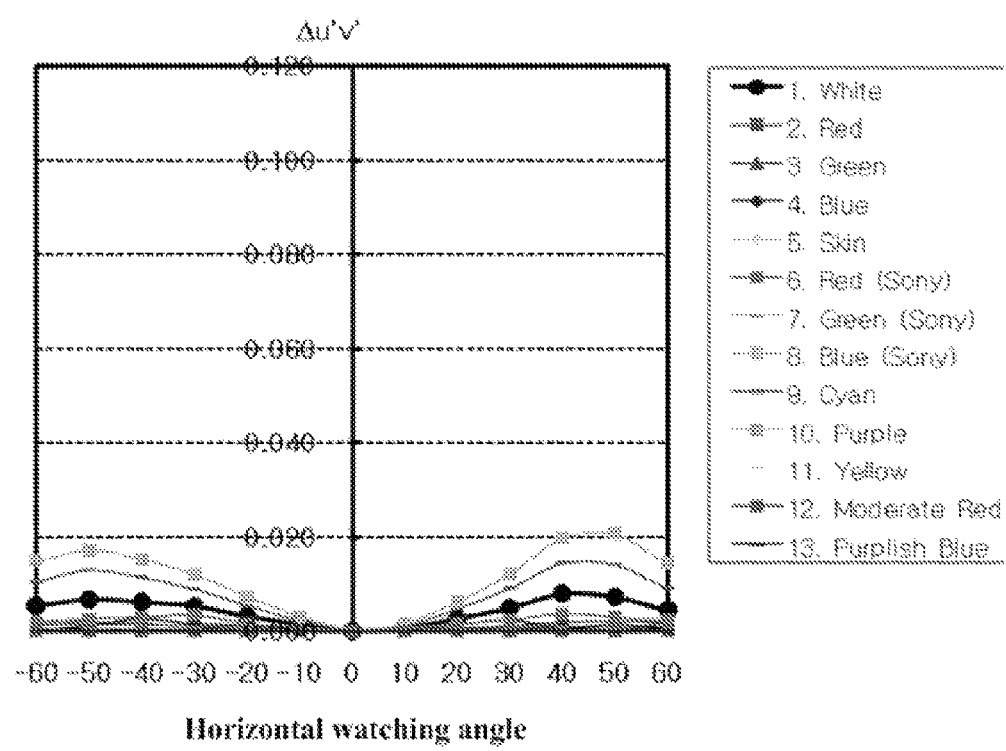
FIG. 34 is a graph showing the result obtained by attaching a self-adhesive optical film for reducing color shift to the display panel in the LCD TV of FIG. 33 and then measuring the rate of color shift reduction.

FIG. 33 is a graph showing color shift in an S-IPS mode LCD TV without an optical film for reducing color shift. FIG. 34 is a graph showing the result obtained by attaching a self-adhesive optical film for reducing color shift (lens parts have a semielliptical cross section with a width of 30 μm, a depth of 60 μm, and a pitch of 83 μm) to the display panel in the LCD TV of FIG. 33 and then measuring the rate of color shift reduction.

The color shift reduction was 50%.

In addition, the effect of reducing color shift can also be obtained from a TN mode LCD. In particular, the TN mode LCD can obtain the effect of reducing grayscale inversion, as described later.

FIGS. 35 to 38 are views showing the relationship between the size of the lens parts and the occurrence of a ghost.

It is possible to prevent a ghost due to the optical film for reducing color shift by providing the optical film for reducing color shift such that the lens parts thereof have a pitch of 45 μm or less and the optical film is in close contact with the display panel. It is preferred that the lens parts have a pitch of 45 μm or less while satisfying both the depth to width ratio and the spacing to pitch ratio described above. If the lens parts have a size less than 0.01 μm, the effect of the lens parts is insignificant, since they act like a thin film that has a refractive index midway between the refractive index of the optical film and the refractive index of the air rather than realizing the above-described color mixing by using reflection, refraction, and diffusion of light. Therefore, it is preferred that the pitch of the lens parts be 0.01 μm or more.

Table 2 below presents the sizes of lens parts of the samples. Here, the lens parts have the same depth to width ratio and the same spacing to pitch ratio.

TABLE 2

| Sample | Width (μm) | Depth (μm) | Pitch (μm) |
| --- | --- | --- | --- |
| #6_ref. | 20 | 62.5 | 90 |
| #6_P1 | 10 | 31.25 | 45 |
| #6_P2 | 6 | 18.75 | 27 |
| #6_P3 | 4 | 12.5 | 18 |

FIG. 35 is a view showing the occurrence of a ghost in Sample #6_P3 according to an example of the invention in comparison with Sample #6_ref. of a comparative example.

As shown in FIG. 35, no ghost occurred in Sample #6_P3, but a ghost occurred in Sample #6_ref.

Figure 36:
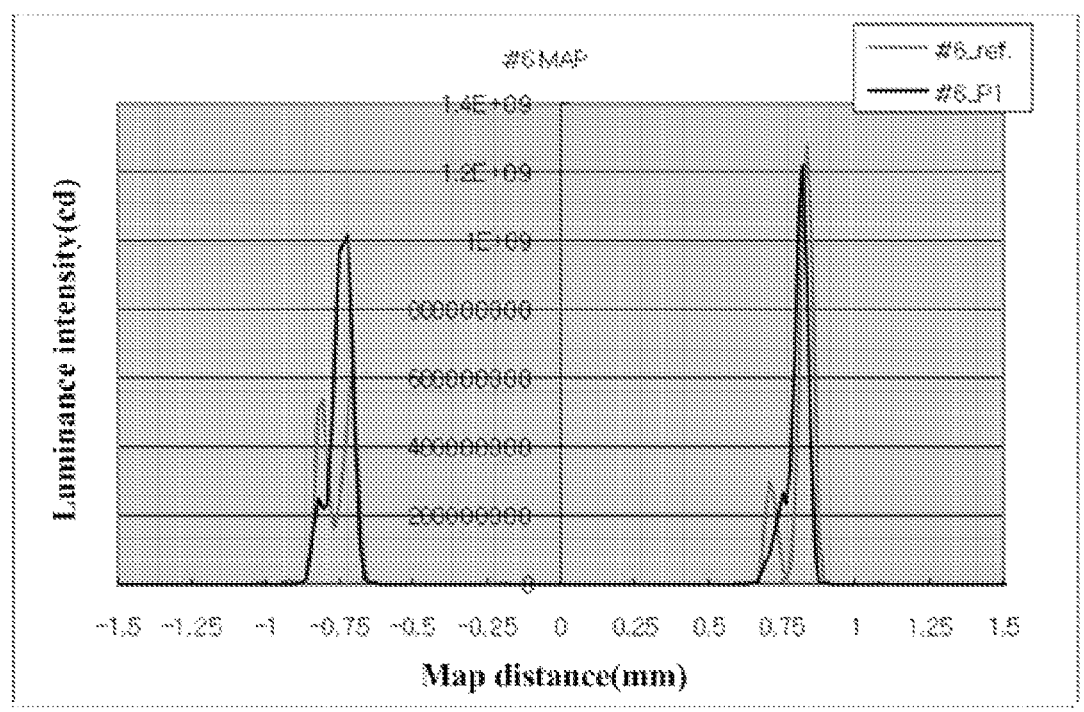
Figure 37:
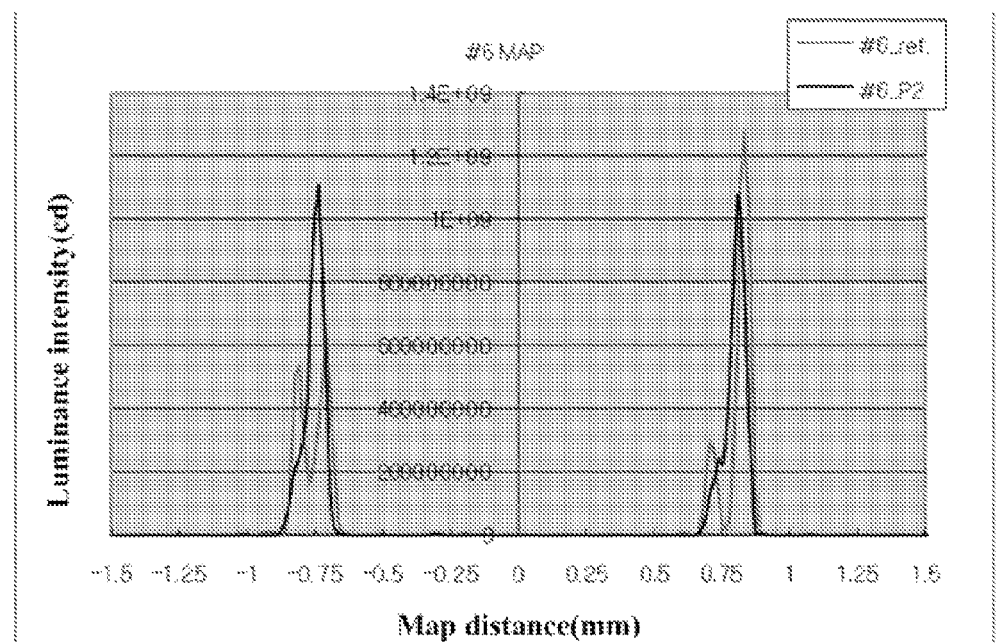
Figure 38:
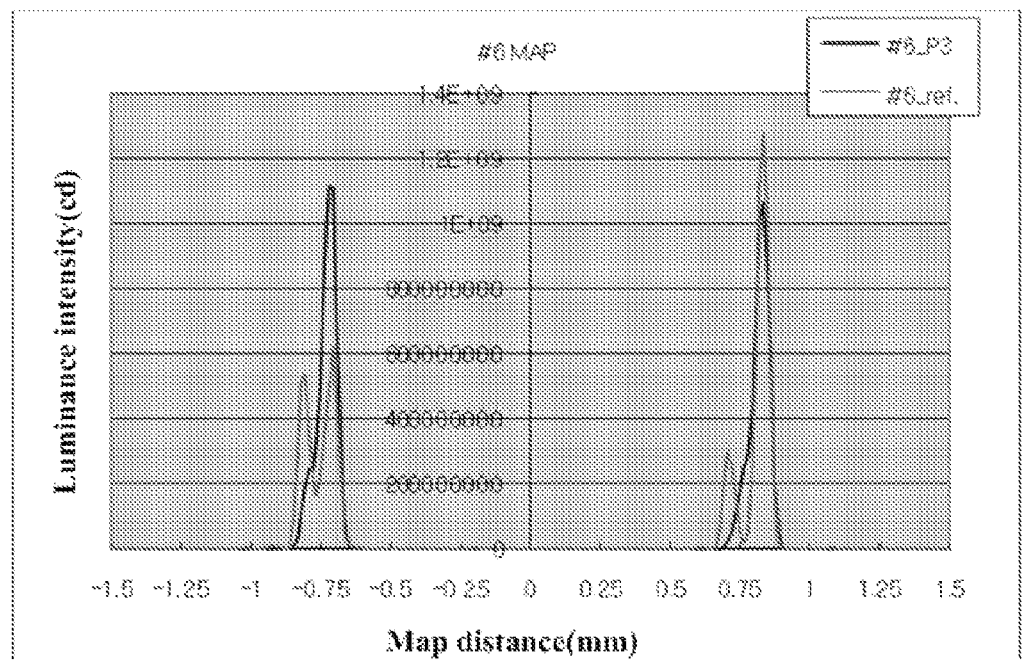

FIGS. 36 to 38 show the result obtained by measuring the luminance of the circular image shown in FIG. 35 along the center line that passes through the center.

As shown in the figures, Sample #6_ref. exhibits two peaks at two intersecting points where the center line meets the image. However, the ghost gradually decreases in the order of Sample #6_P1 of FIG. 36, Sample #6_P2 of FIG. 37, and Sample #6_P3 of FIG. 38.

Figure 39:
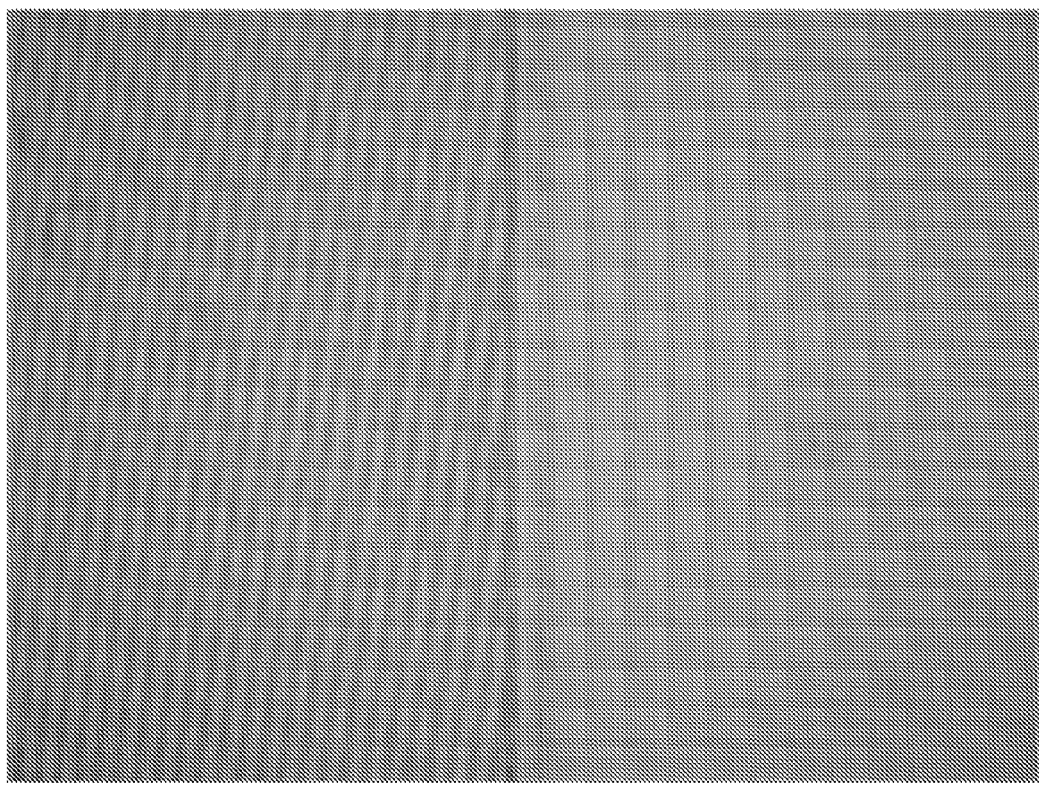
FIG. 39 is a view showing the relationship between the size of the lens parts and a moiré phenomenon.

FIG. 39 is a view showing the relationship between the size of the lens parts and a moiré phenomenon.

As shown in FIG. 39, a moiré phenomenon occurs in Sample #6_ref. but does not occur in Sample #6_P1.

Figure 40:
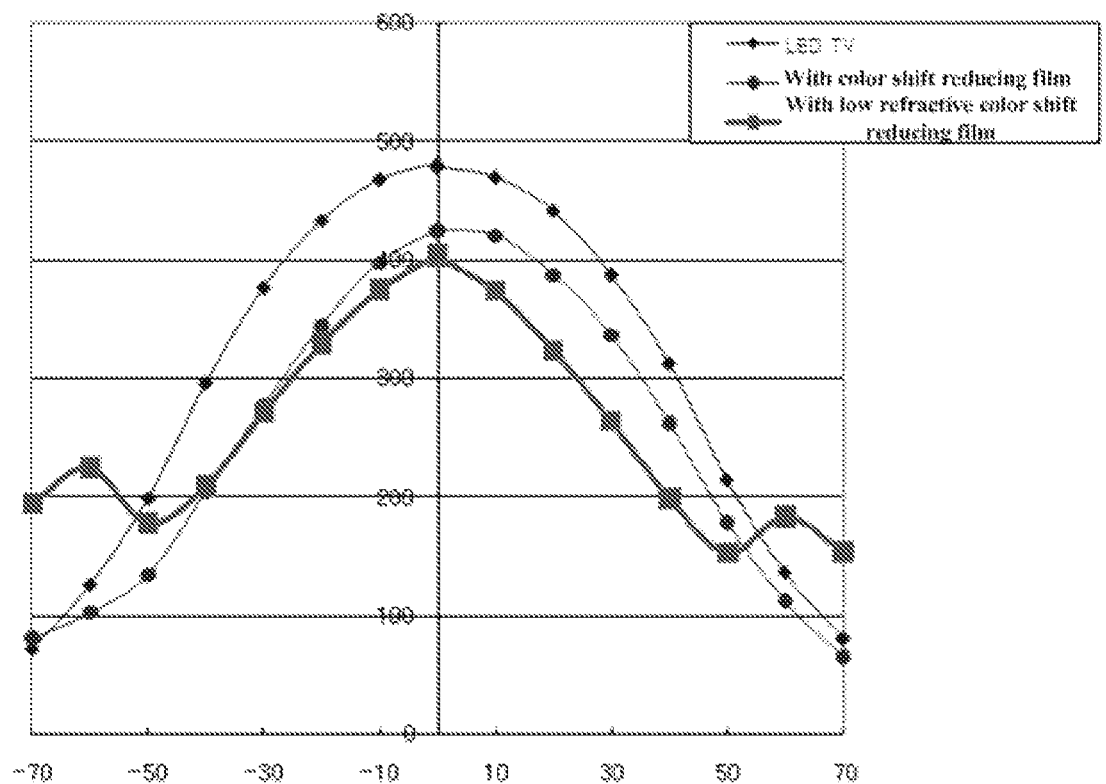
FIG. 40 is a view showing the influence of the refractive index of the background layer to the luminance at a high watching angle.

FIG. 40 is a view showing the influence of the refractive index of the background layer to the luminance at a high watching angle.

Although color shift is reduced using the optical film for reducing color shift as described above, the image quality is not good when watching the image at high horizontal watching angles of 50° or more, since light exiting from the display device at those angles has low luminance. Therefore, the demand exists for an optical film for reducing color shift and a display device that make it possible to provide bright images at a high watching angle of 50° or more.

For this, the optical film for reducing color shift can be manufactured such that the background layer has a low refractive index ranging from 1.40 to 1.45 instead of a refractive index of 1.5 generally used. Then, as shown in FIG. 40, a clear image can be produced because of an increase in luminance at a high watching angle of 50° or more.

FIGS. 41 to 44 are graphs showing that an optical film for reducing color shift according to an exemplary embodiment of the invention reduces color shift, grayscale inversion, and gamma-curve distortion in an LCD monitor (model number: B2440 MH) with a CCFL BLU and a TN panel.

Figure 41:
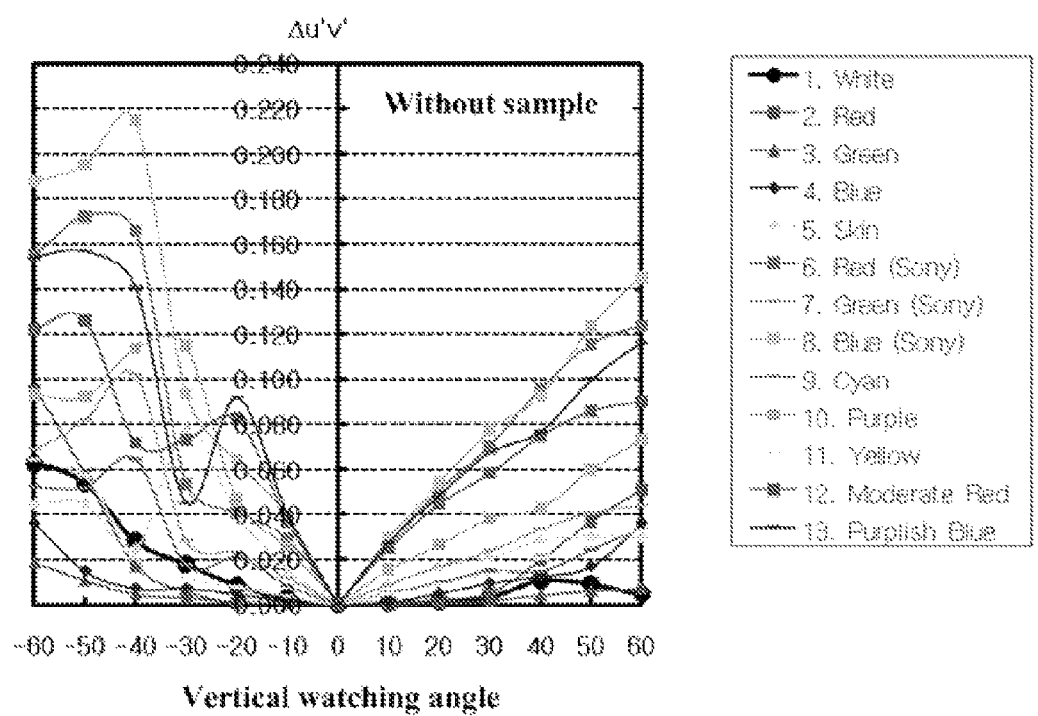
FIGS. 41 to 44 are graphs showing that color shift, grayscale inversion, and gamma-curve distortion are reduced by an optical film for reducing color shift according to an exemplary embodiment of the invention in an LCD monitor (model name: B2440 MH) with a CCFL BLU and a TN panel.
Figure 42:
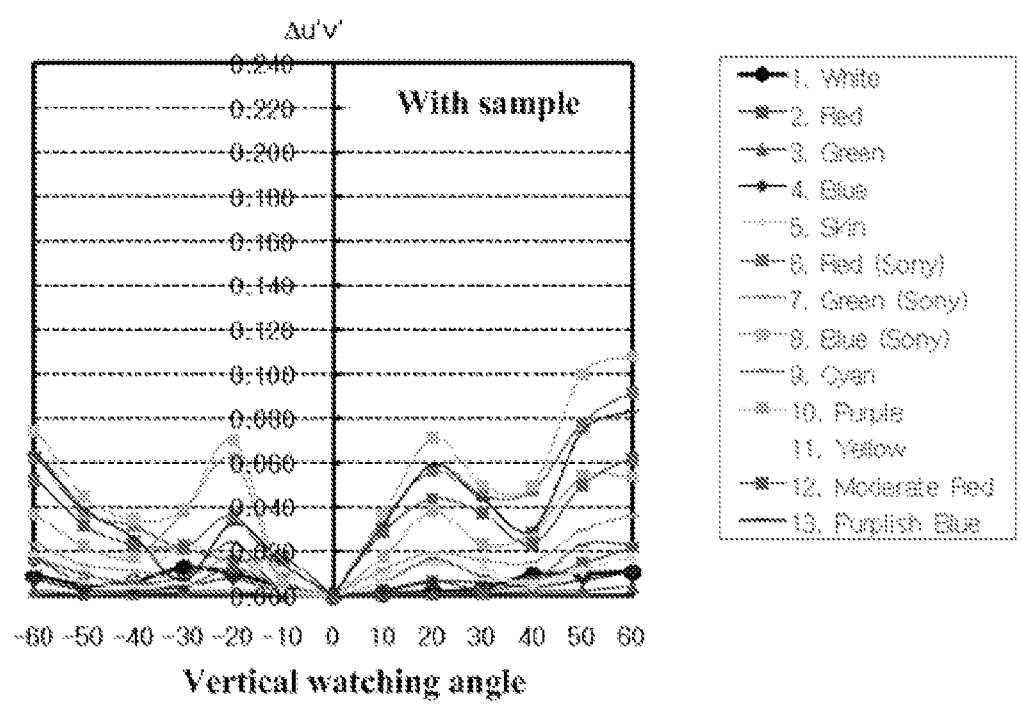

In order to measure the degree of color shift reduction, an SS320 goniometer was used as a measuring device. FIG. 41 was obtained by measuring color coordinates at vertical watching angles ranging from 0 to 60° at an interval of 10° and then converting the color coordinates into color shift. FIG. 42 was obtained by directly attaching an optical film sample to the display panel and then measuring and converting in the same manner. As can be seen, the ratios of color shift reduction were 25.5% (up) and 65.4% (down).

Figure 43:
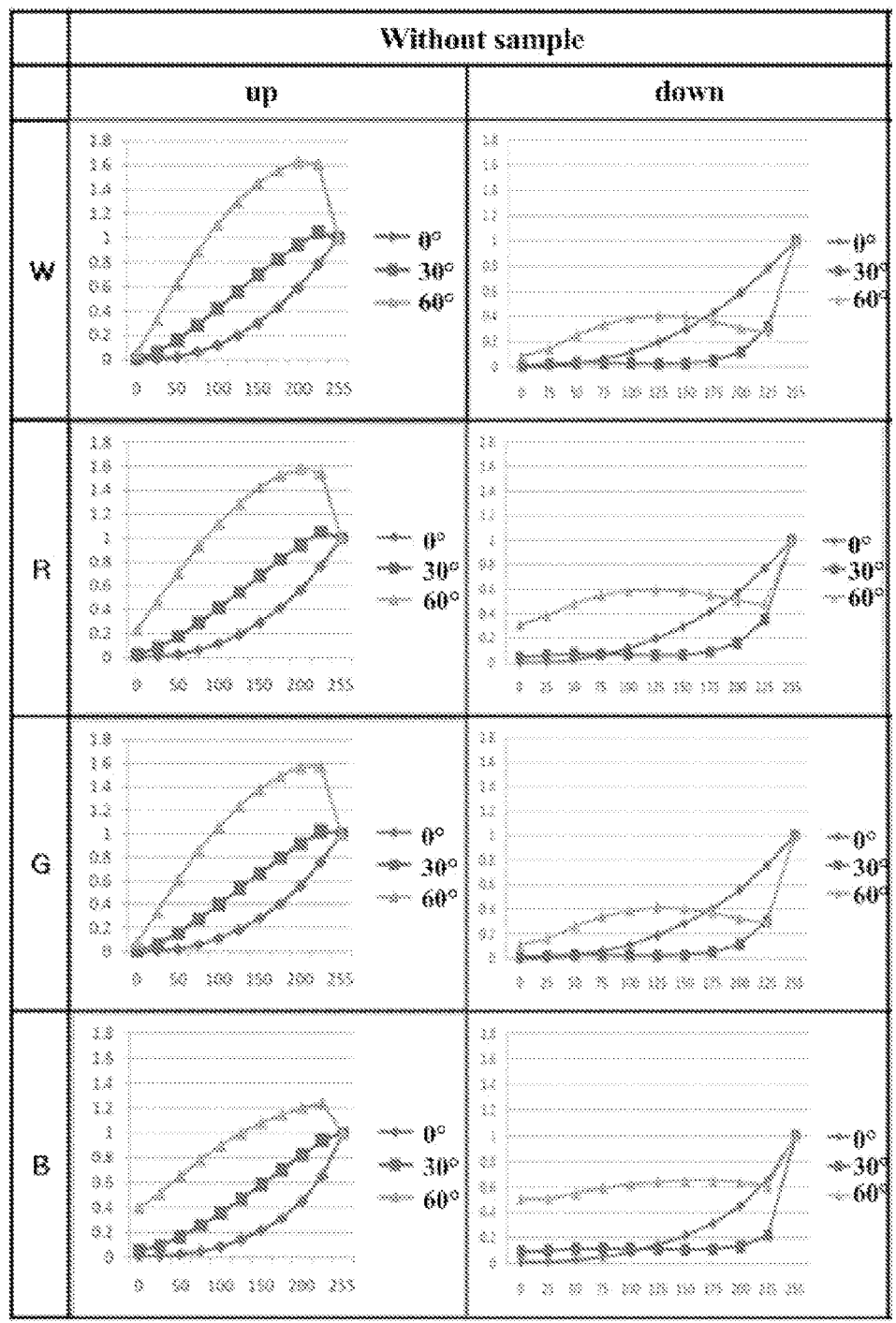
Figure 44:
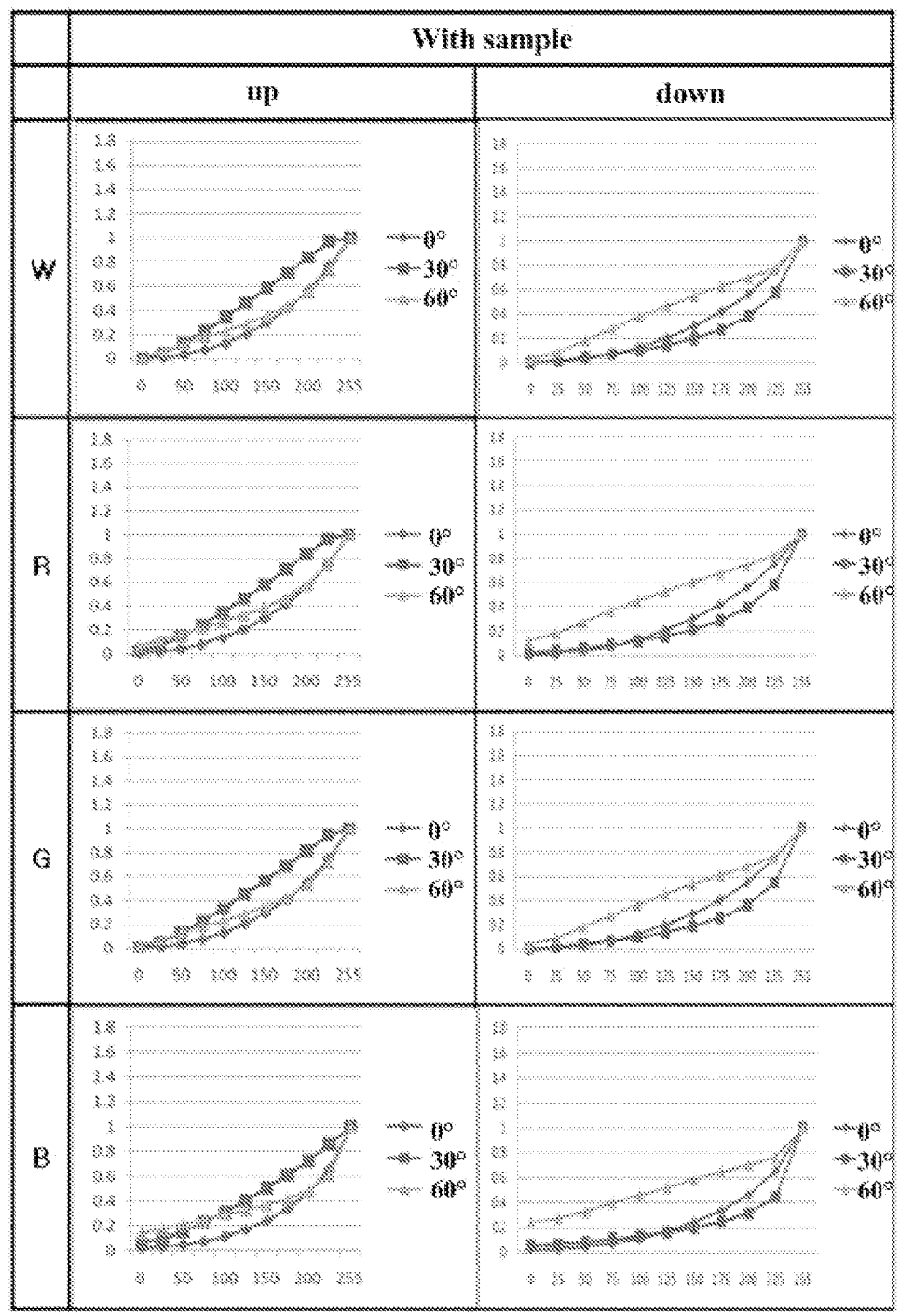

In order to measure the degree of reduction in grayscale inversion and gamma-curve distortion, CS-1000 was used as a measuring device. FIG. 43 was obtained by measuring luminances with respect to gray levels of W, R, G and B at vertical watching angles of 0° (the front), 30° and 60°. FIG. 44 was obtained by directly attaching an optical film sample to the display panel and then measuring in the same manner. As can be seen, when the optical film was used, grayscale inversion was reduced as a result of the recovery of gamma-curve linearity, the difference between gamma-curves was significantly decreased, and gamma-curve distortion was decreased.

FIGS. 45 to 48 are graphs showing that the optical film for reducing color shift according to an exemplary embodiment of the invention reduces color shift, grayscale inversion, and gamma-curve distortion in an LCD monitor (model number: BX2440) with an LED BLU and a TN panel.

Figure 45:
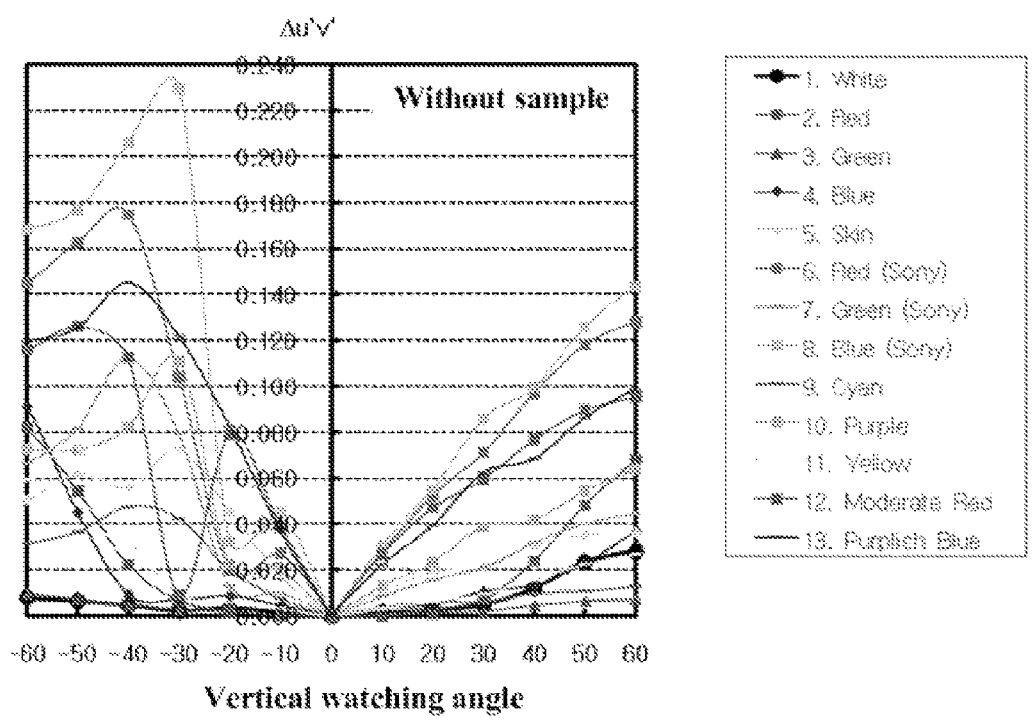
FIGS. 45 to 48 are graphs showing that an optical film for reducing color shift according to an exemplary embodiment of the invention reduces color shift, grayscale inversion, and gamma-curve distortion in an LCD monitor (model number: BX2440) with an LED BLU and a TN panel.
Figure 46:
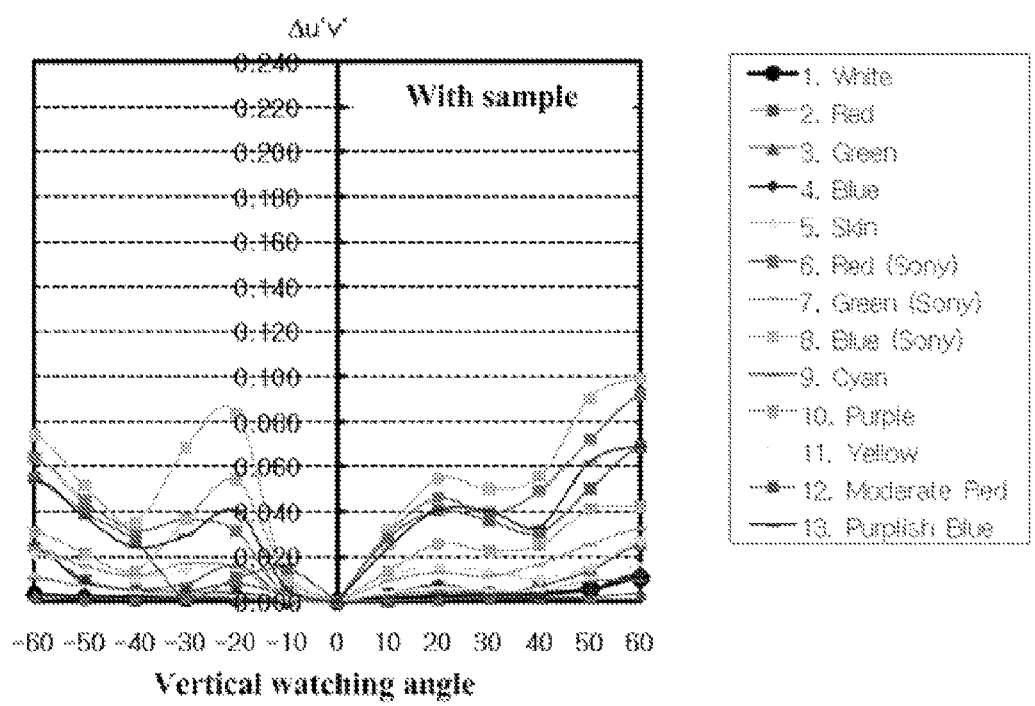

In order to measure the degree of color shift reduction, an SS320 goniometer was used as a measuring device. FIG. 45 was obtained by measuring color coordinates at vertical watching angles ranging from 0 to 60° at an interval of 10° and then converting the color coordinates into color shift. FIG. 46 was obtained by directly attaching an optical film sample to the display panel and then measuring and converting in the same manner. As can be seen, the ratios of color shift reduction were 30.9% (up) and 63.5% (down).

Figure 47:
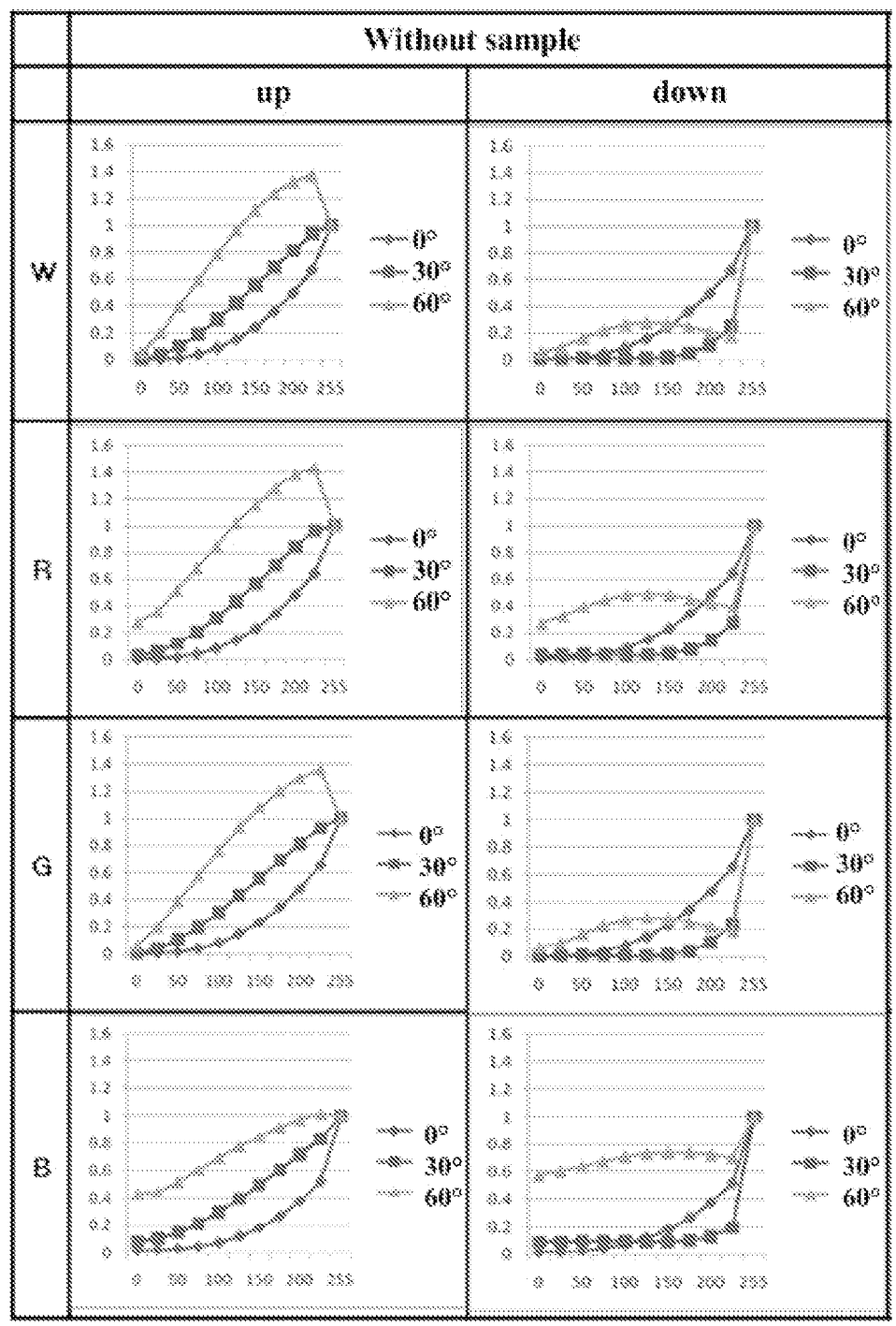
Figure 48:
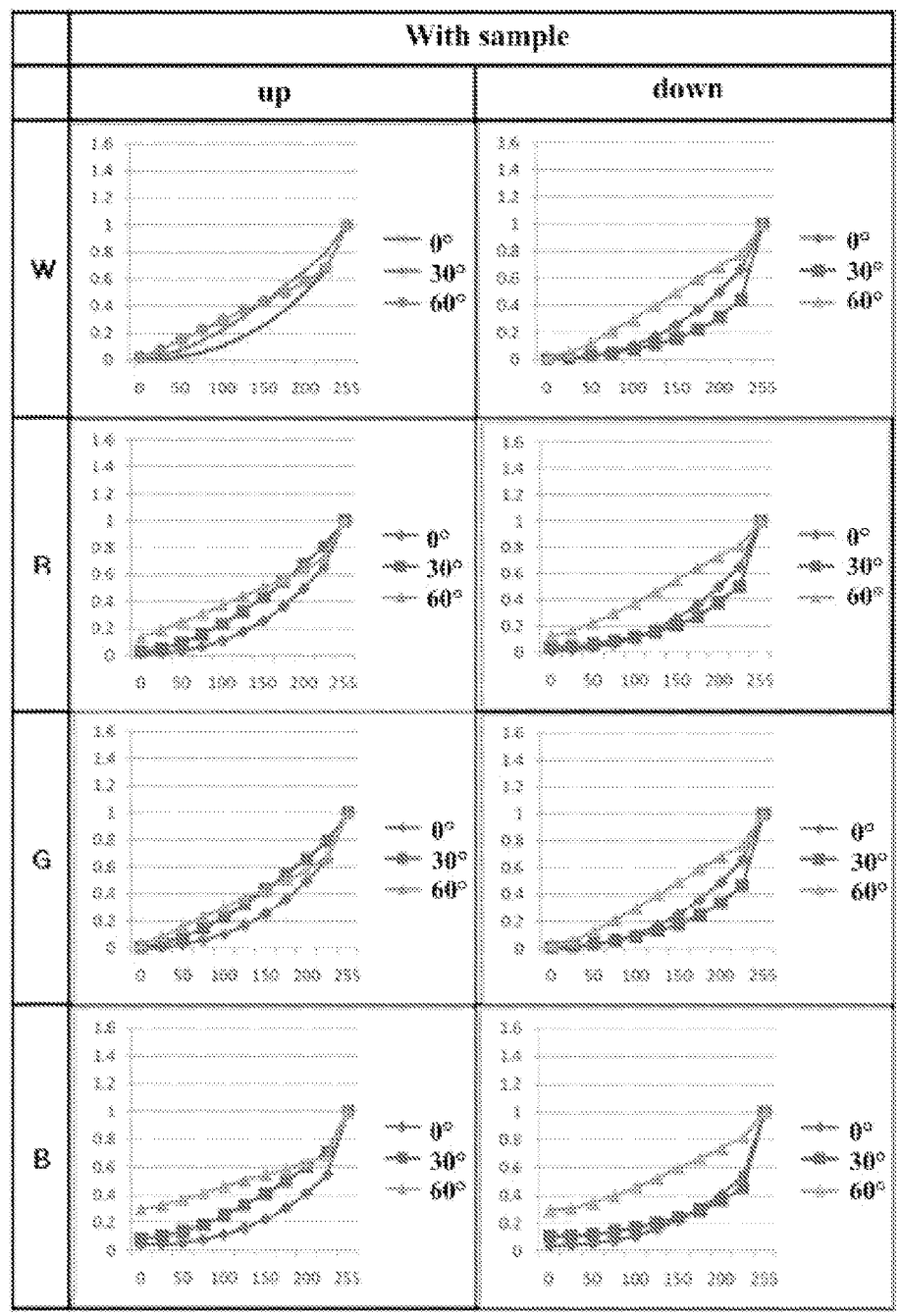

In order to measure the degree of reduction in grayscale inversion and gamma-curve distortion, CS-1000 was used as a measuring device. FIG. 47 was obtained by measuring luminances with respect to gray levels of W, R, G, and B at vertical watching angles of 0°, 30° and 60°. FIG. 48 was obtained by directly attaching an optical film sample to the display panel and then measuring in the same manner. As can be seen, when the optical film was used, grayscale inversion was reduced as a result of the recovery of gamma-curve linearity, the difference between gamma-curves was significantly decreased, and gamma-curve distortion was decreased.

FIGS. 49 to 52 are graphs showing that the optical film for reducing color shift according to an exemplary embodiment of the invention reduces color shift and gamma-curve distortion in a 46" LCD TV (model number: LH46CSPLBC) with an S-PVA panel.

Figure 49:
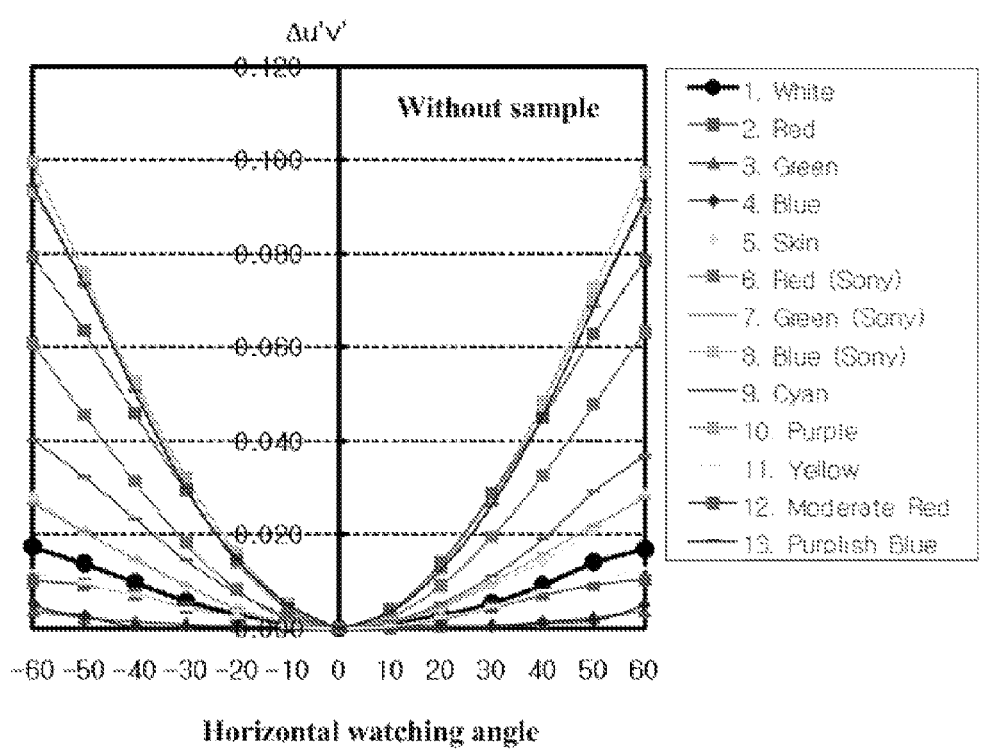
FIGS. 49 to 52 are graphs showing that the optical film for reducing color shift according to an exemplary embodiment of the invention reduces color shift and gamma-curve distortion in a 46" LCD TV (model number: LH46CSPLBC) with an S-PVA panel.
Figure 50:
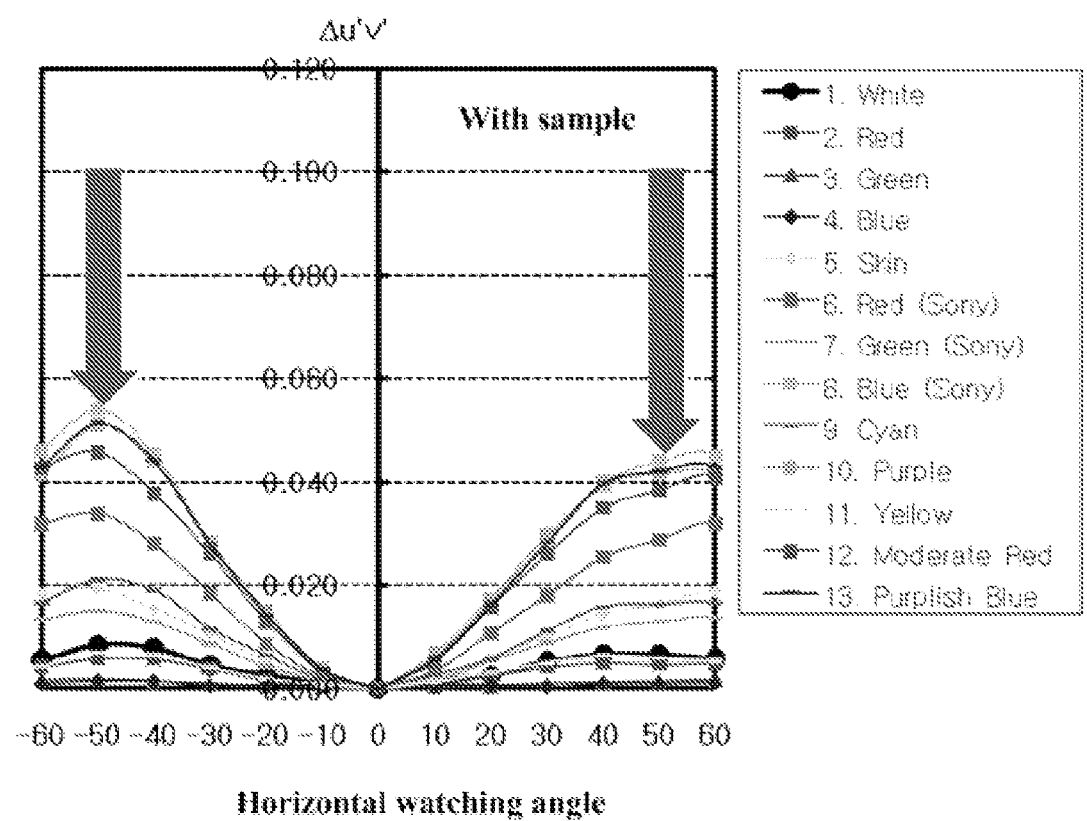

In order to measure the degree of color shift reduction, an SS320 goniometer was used as a measuring device. FIG. 49 was obtained by measuring color coordinates at horizontal watching angles ranging from 0 to 60° at an interval of 10° and then converting the color coordinates into color shift. FIG. 50 was obtained by directly attaching an optical film sample to the display panel and then measuring and converting in the same manner. As can be seen, the ratios of color shift reduction were 48.7% (left) and 53.7% (right).

Figure 51:
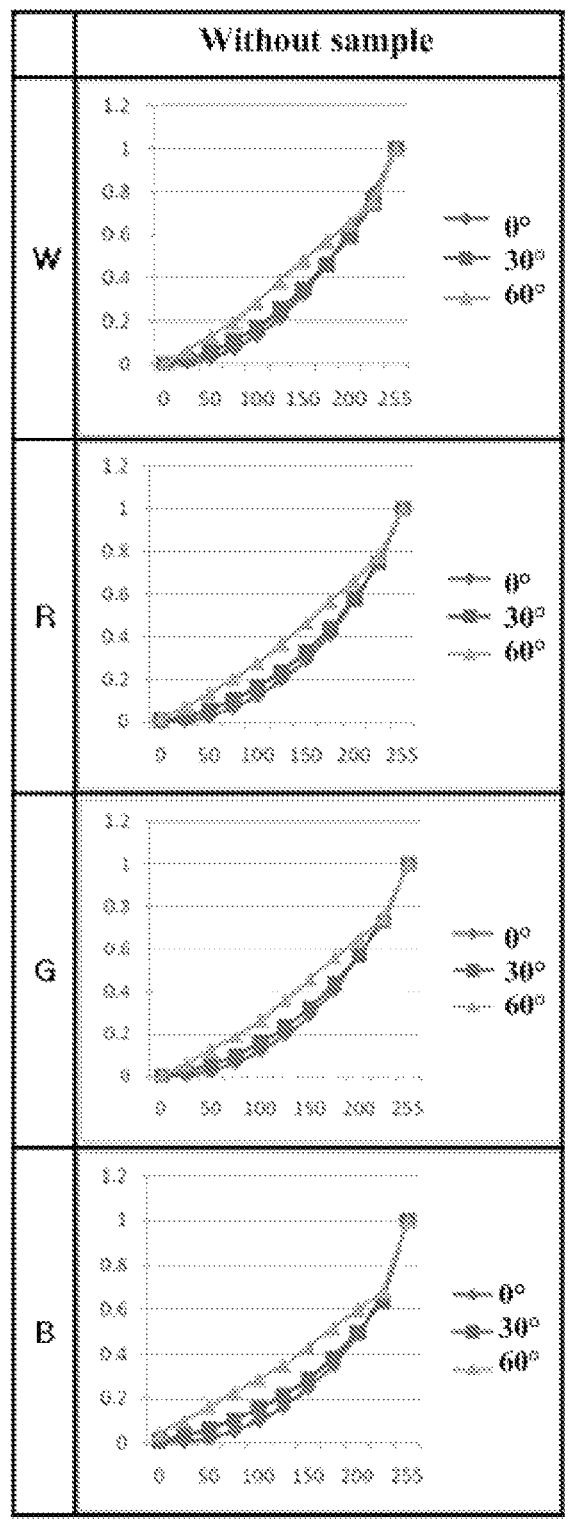
Figure 52:
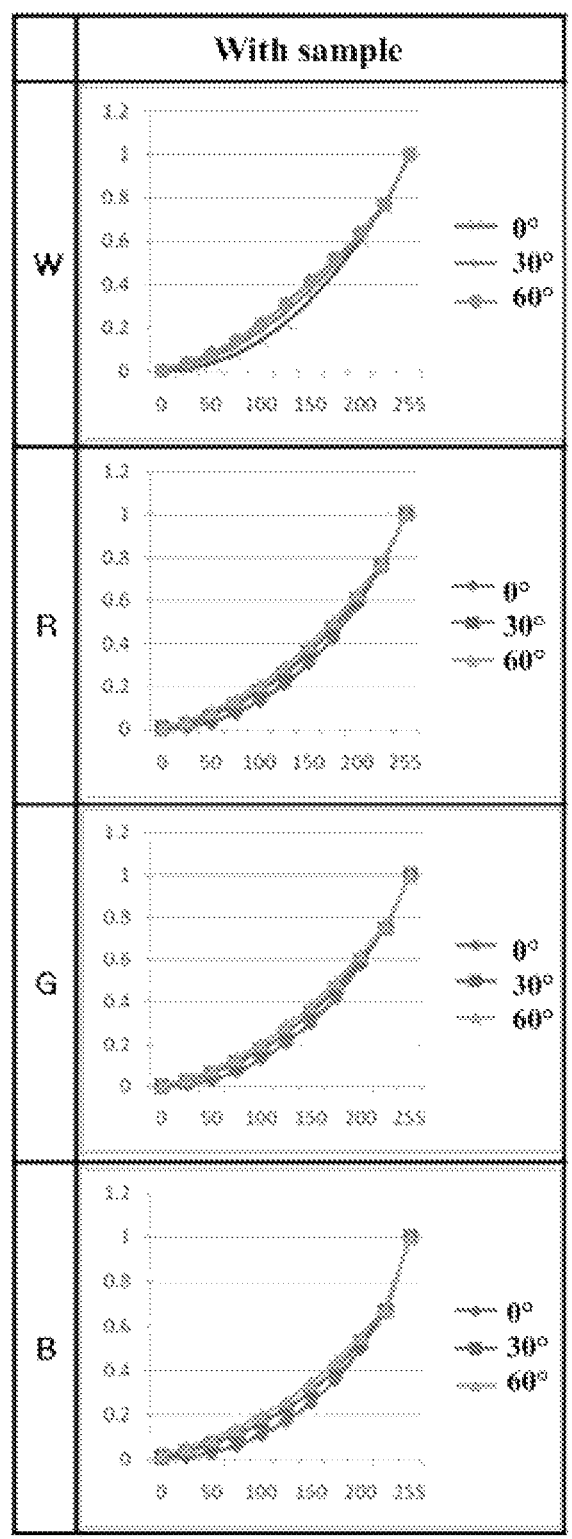

In order to measure the degree of reduction in gamma-curve distortion, CS-1000 was used as a measuring device. FIG. 51 was obtained by measuring luminances with respect to gray levels of W, R, G, and B at left horizontal watching angles of 0°, 30° and 60°. FIG. 52 was obtained by directly attaching an optical film sample to the display panel and then measuring in the same manner. As can be seen, when the optical film was used, the difference between gamma-curves was significantly decreased.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An optical film for reducing color shift provided in front of a display panel comprising:
    a background layer; and
    a plurality of lens parts, which are spaced apart from each other, engraved or embossed on the background layer,
    wherein the lens parts diffuse light incident on the lens parts and then mix the diffused light with light passing between the lens parts,
    wherein the lens parts have a depth to width ratio of 0.25 or more, and
    wherein an outline of a cross section of the lens parts has a larger curvature than a straight line.

2. The optical film according to claim 1, wherein the lens parts have a spacing to pitch ratio ranging from 0.5 to 0.95.

3. The optical film according to claim 1, wherein the lens parts have a pitch of 45 μm or less.

4. The optical film according to claim 1, wherein the background layer have a refractive index ranging from 1.40 to 1.45.

5. The optical film according to claim 1, wherein the cross-sectional shape of the lens parts includes an elliptical arc.

6. The optical film according to claim 1, wherein the lens parts have a pattern selected from the group consisting of: stripes having a semicircular cross section, waves having a semicircular cross section, a matrix having a semicircular cross section, a honeycomb having a semicircular cross section, dots having a semicircular cross section, stripes having a semi-elliptical cross section, waves having a semi-elliptical cross section, a matrix having a semi-elliptical cross section, a honeycomb having a semi-elliptical cross section, dots having a semi-elliptical cross section, stripes having a semi-oval cross section, waves having a semi-oval cross section, a matrix having a semi-oval cross section, a honeycomb having a semi-oval cross section, and dots having a semi-oval cross section.

7. The optical film according to claim 1, wherein the lens parts are formed on one surface or both surfaces of the background layer.

8. The optical film according to claim 1, wherein the background layer is made of transparent polymer resin.

9. The optical film according to claim 1, wherein the background layer has self-adhesive property.

10. The optical film according to claim 9, wherein the background layer is made of transparent elastomer.

11. A display device comprising:
    a display panel;
    an optical film for reducing color shift provided in front of the display panel, wherein the optical film comprises:
        a background layer; and
        a plurality of lens parts, which are spaced apart from each other, engraved or embossed on the background layer,
        wherein the lens parts diffuse light incident on the lens parts and then mix the diffused light with light passing between the lens parts,
        wherein the lens parts have a depth to width ratio of 0.25 or more, and
        wherein an outline of a cross section of the lens parts has a larger curvature than a straight line.

12. The display device according to claim 11, wherein the lens parts is provided on a surface of the background layer that faces the display panel.

13. The display device according to claim 11, wherein the optical film is in close contact with the display panel.

14. The display device according to claim 13, wherein the optical film is adhered to the display panel by means of an adhesive.

15. The display device according to claim 13, wherein the background layer has self-adhesive property and is directly attached to the display panel.

16. The display device according to claim 11, wherein the background layer have a refractive index ranging from 1.40 to 1.45.

* * * * *